United States Patent
Honda

(10) Patent No.: US 9,148,241 B2
(45) Date of Patent: Sep. 29, 2015

(54) TRANSMISSION APPARATUS

(75) Inventor: Takashi Honda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 1047 days.

(21) Appl. No.: 12/855,681

(22) Filed: Aug. 12, 2010

(65) Prior Publication Data

US 2011/0052186 A1    Mar. 3, 2011

(30) Foreign Application Priority Data

Aug. 26, 2009 (JP) .................. 2009-195963

(51) Int. Cl.
*H04J 3/14* (2006.01)

(52) U.S. Cl.
CPC ............. *H04J 3/14* (2013.01); *H04J 2203/006* (2013.01)

(58) Field of Classification Search
CPC ............................. H04J 2203/006; H04J 3/14
USPC .......... 370/217, 219, 331, 218; 455/433, 458, 455/411, 415
See application file for complete search history.

(56) References Cited

U.S. PATENT DOCUMENTS

| | | | | |
|---|---|---|---|---|
| 5,185,736 A * | 2/1993 | Tyrrell et al. | ................. | 370/358 |
| 5,577,096 A * | 11/1996 | Kitano et al. | ..................... | 379/2 |
| 5,757,769 A * | 5/1998 | Ikawa | ............................ | 370/228 |
| 5,870,382 A * | 2/1999 | Tounai et al. | .................. | 370/220 |
| 7,260,058 B1 * | 8/2007 | Joshi et al. | .................... | 370/217 |
| 7,315,511 B2 * | 1/2008 | Morita et al. | ................. | 370/227 |
| 7,580,348 B2 * | 8/2009 | Maruyama et al. | ........... | 370/219 |
| 7,724,653 B2 | 5/2010 | Konuma et al. | | |
| 2002/0141332 A1 * | 10/2002 | Barnard et al. | ............... | 370/218 |
| 2002/0194531 A1 * | 12/2002 | Lerman | ........................... | 714/11 |
| 2010/0177630 A1 | 7/2010 | He et al. | | |
| 2010/0177639 A1 * | 7/2010 | Nam | ............................. | 370/237 |

FOREIGN PATENT DOCUMENTS

| | | |
|---|---|---|
| JP | 2001-69152 A | 3/2001 |
| JP | 2001-86087 A | 3/2001 |
| JP | 2001-339370 A | 12/2001 |
| JP | 2006-261980 A | 9/2006 |
| WO | WO-2006/114809 A1 | 11/2006 |

OTHER PUBLICATIONS

USPTO [Duong] "U.S. Appl. No. 12/862,747 (related)," [CTNF] Non-Final Rejection issued on Sep. 26, 2012 (abandoned).
Japanese Office Action mailed Oct. 8, 2013 for corresponding to Japanese Application No. 2009-195963, with Partial English-language Translation.

* cited by examiner

*Primary Examiner* — Khaled Kassim
(74) *Attorney, Agent, or Firm* — Fujitsu Patent Center

(57) ABSTRACT

A transmission apparatus switches to a line of one standby system upon occurrence of a fault on any one of n lines of a working system. The transmission apparatus includes a switching controller that when switching from a line of the working system to a line of the standby-system upon the occurrence of the fault and executing a given command to put the line causing the fault in a given state of line switching according to the given command, causes the working system to maintain the state of line switching according to the given command even after restoration from the fault.

14 Claims, 30 Drawing Sheets

FIG.6

| K1 BYTE (BIT 1-4) | GR253 | ITU-T G.841 | PRESENT INVENTION | |
|---|---|---|---|---|
| 1111 | LOCKOUT OF PROTECTION | LOCKOUT OF PROTECTION | LOCKOUT OF PROTECTION | |
| 1110 | FORCED SWITCH | FORCED SWITCH | FORCED SWITCH | P4 |
| 1101 | SF - HIGH PRIORITY | SF - HIGH PRIORITY | SF - HIGH PRIORITY | P3a |
| #1 | - | - | ADVANCED MANUAL SWITCH + SF(HIGH) | P10a |
| 1100 | SF - LOW PRIORITY | SF - LOW PRIORITY | SF - LOW PRIORITY | P3b |
| #2 | - | - | ADVANCED MANUAL SWITCH + SF(LOW) | P10b |
| 1011 | SD - HIGH PRIORITY | SD - HIGH PRIORITY | SD - HIGH PRIORITY | P3c |
| #3 | - | - | ADVANCED MANUAL SWITCH + SD(HIGH) | P10c |
| 1010 | SD - LOW PRIORITY | SD - LOW PRIORITY | SD - LOW PRIORITY | P3d |
| #4 | - | - | ADVANCED MANUAL SWITCH + SD(LOW) | P10d |
| 1001 | (NOT USED) | UNUSED | UNUSED | |
| 1000 | MANUAL SWITCH | MANUAL SWITCH | MANUAL SWITCH | P2 |
| 0111 | (NOT USED) | UNUSED | UNUSED | |
| 0110 | WAIT TO RESTORE | WAIT TO RESTORE | WAIT TO RESTORE | |
| 0101 | (NOT USED) | UNUSED | UNUSED | |
| 0100 | WAIT TO RESTORE | WAIT TO RESTORE | WAIT TO RESTORE | |
| 0011 | (NOT USED) | UNUSED | UNUSED | |
| 0010 | REVERSE REQUEST | REVERSE REQUEST | REVERSE REQUEST | |
| 0001 | DO NOT REVERT | DO NOT REVERT | DO NOT REVERT | |
| 0000 | NO REQUEST | NO REQUEST | NO REQUEST | |

HIGH ↑ ↓ LOW

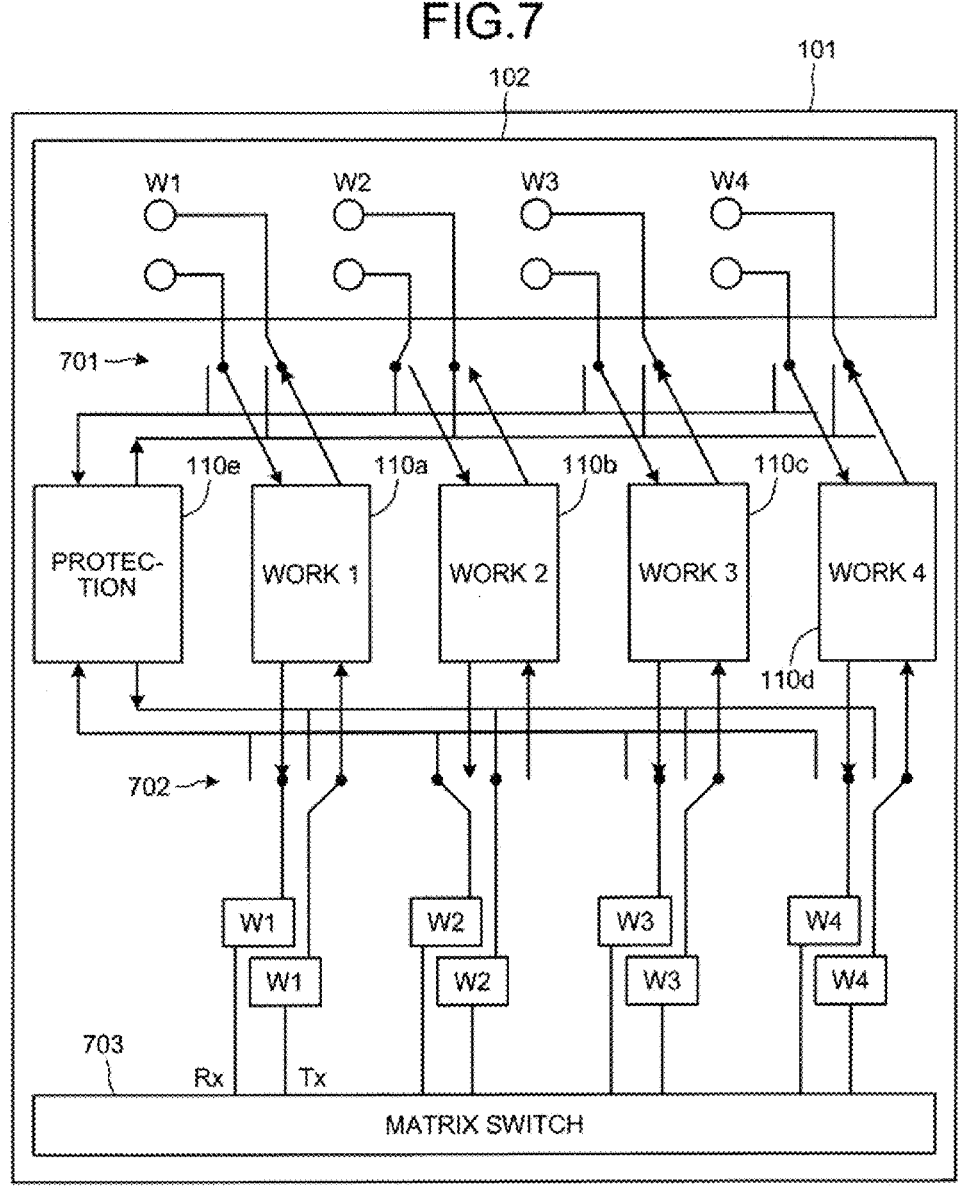

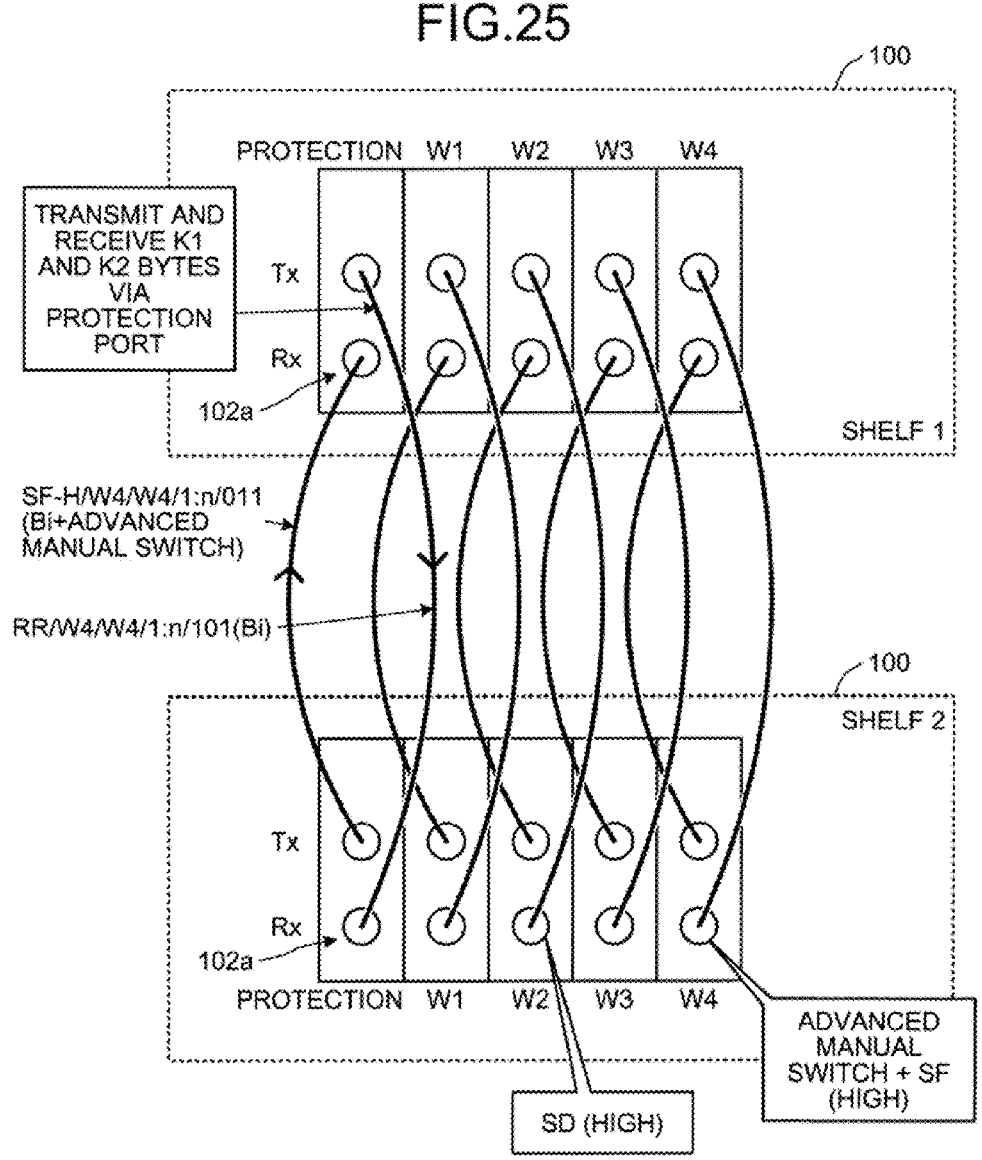

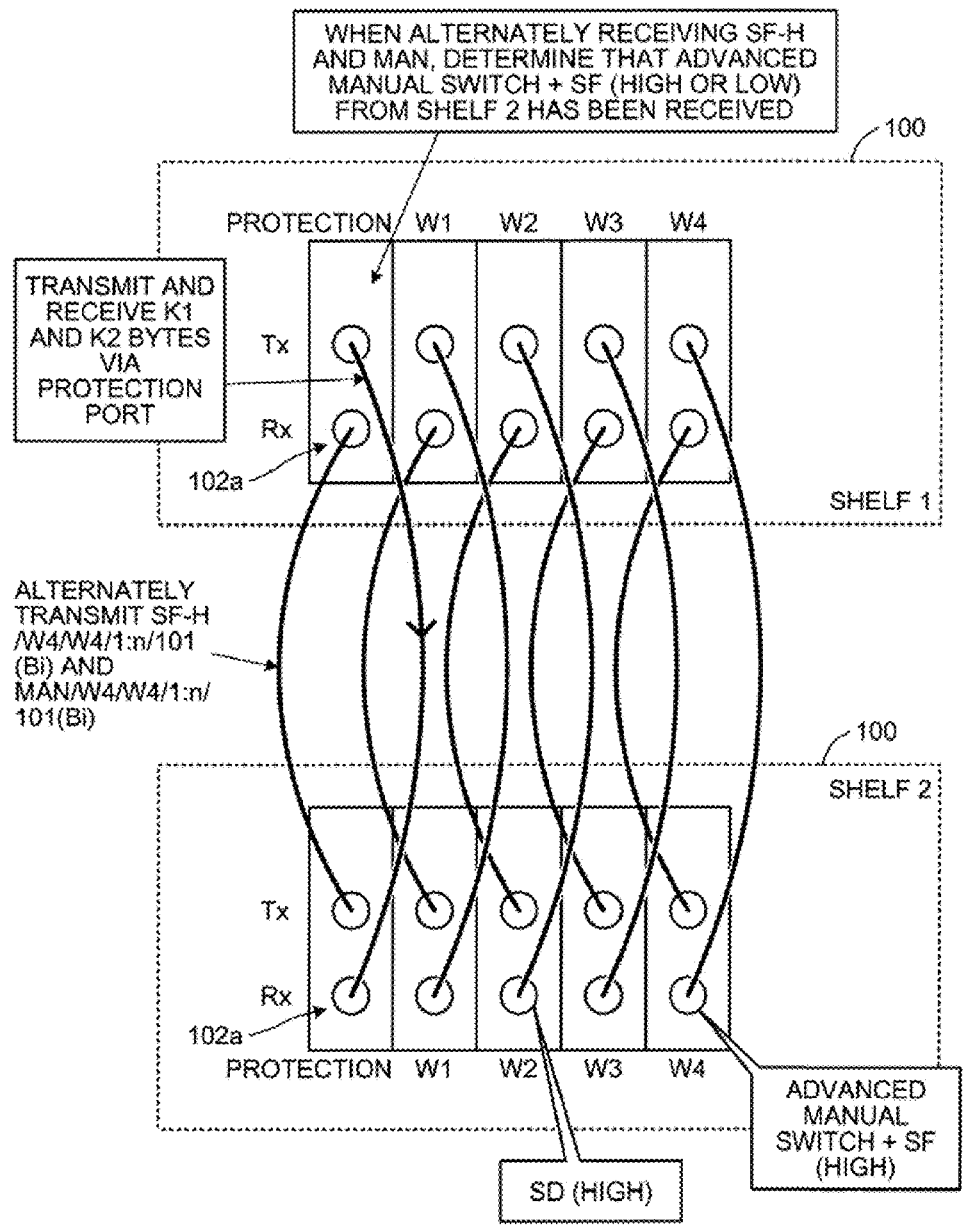

FIG.27

| | CONFIGURATION EXAMPLE 1 | | CONFIGURATION EXAMPLE 2 |
|---|---|---|---|
| | UNI-DIRECTIONAL MODE | BI-DIRECTIONAL MODE | |
| (#1): ADVANCED MANUAL SWITCH + SF (HIGH) | K1 BYTE BIT1-4: 1101, K2 BYTE BIT6-8: 010 | K1 BYTE BIT1-4: 1101, K2 BYTE BIT6-8: 011 | ALTERNATELY TRANSMIT K1 BYTE BITS 1-4 "1101" AND K1 BYTE BITS 1-4 "1000" (MAN) |
| (#2): ADVANCED MANUAL SWITCH + SF (LOW) | K1 BYTE BIT1-4: 1100, K2 BYTE BIT6-8: 010 | K1 BYTE BIT1-4: 1100, K2 BYTE BIT6-8: 011 | ALTERNATELY TRANSMIT K1 BYTE BITS 1-4 "1100" AND K1 BYTE BITS 1-4 "1000" (MAN) |
| (#3): ADVANCED MANUAL SWITCH + SD (HIGH) | K1 BYTE BIT1-4: 1011, K2 BYTE BIT6-8: 010 | K1 BYTE BIT1-4: 1011, K2 BYTE BIT6-8: 011 | ALTERNATELY TRANSMIT K1 BYTE BITS 1-4 "1011" AND K1 BYTE BITS 1-4 "1000" (MAN) |
| (#4): ADVANCED MANUAL SWITCH + SD (LOW) | K1 BYTE BIT1-4: 1010, K2 BYTE BIT6-8: 010 | K1 BYTE BIT1-4: 1010, K2 BYTE BIT6-8: 011 | ALTERNATELY TRANSMIT K1 BYTE BITS 1-4 "1010" AND K1 BYTE BITS 1-4 "1000" (MAN) |

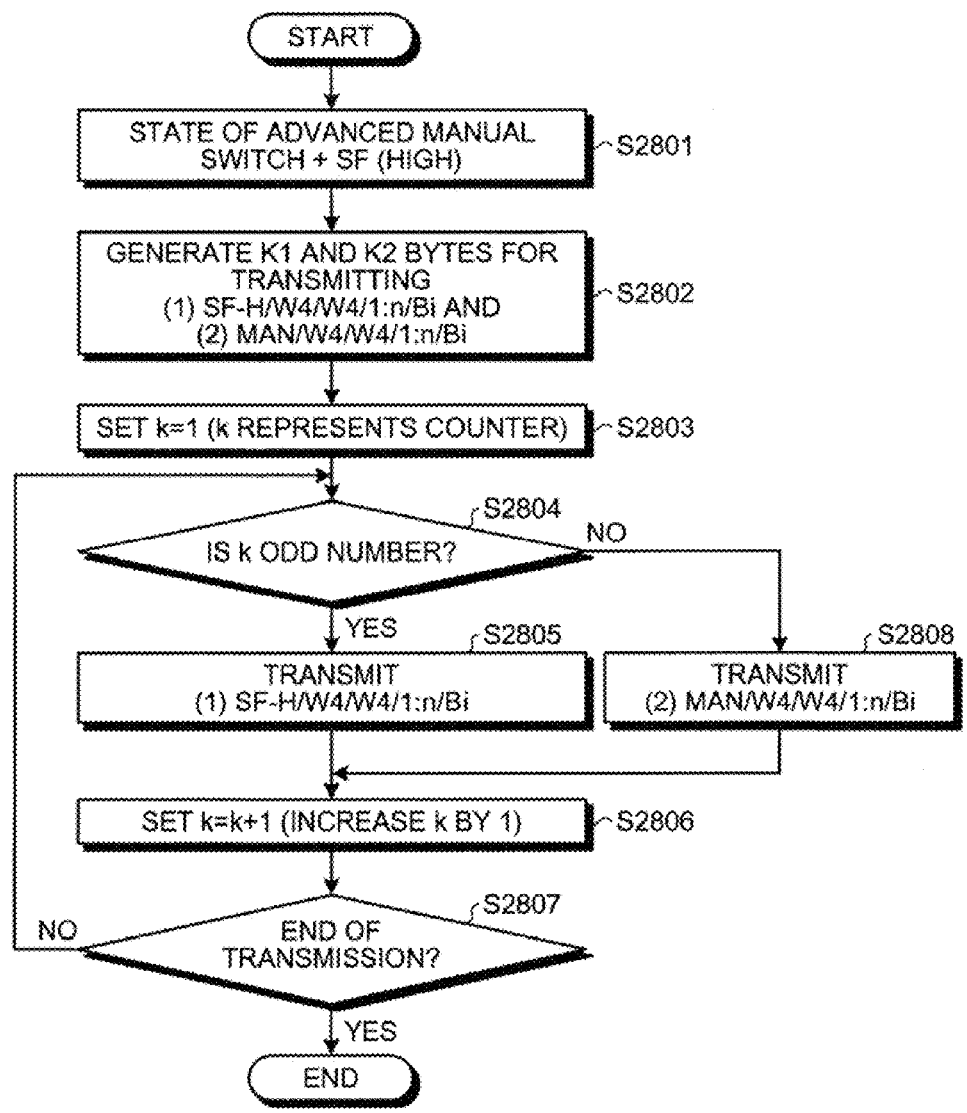

TRANSMISSION APPARATUS

CROSS-REFERENCE TO RELATED APPLICATIONS

This application is based upon and claims the benefit of priority from the prior Japanese Patent Application No. 2009-195963, filed on Aug. 26, 2009, the entire contents of which are incorporated herein by reference.

FIELD

The embodiments discussed herein are related to a transmission apparatus and standby-system line switching.

BACKGROUND

Conventional transmission systems include a system that uses a transmission apparatus having a 1-to-n redundant configuration in which one station is connected to another station through normally used n working-system transmission paths and one standby-system transmission path. When a fault occurs on a working-system path (transmission path, unit, or line), the transmission apparatus switches from the working-system line (working line) to a standby-system line (protection line). An optical signal or electrical signal is transmitted through the transmission path.

1-to-1 or 1-to-n line switching carried out upon the occurrence of a fault is defined in the communication standard provided in GR-253 and ITU-T Standard G. 841. In line switching, a fault countermeasure command is transmitted and received between a monitoring device and the transmission apparatus, and 1-to-1 or 1-to-n line switching is carried out. Switching information is defined as such a command in K1 and K2 bytes included in the header of a transmission frame. When a fault occurs on the working system, the K1 and K2 bytes representing switching information are transmitted and received between one transmission apparatus and another transmission apparatus, using a frame transmitted through the standby-system line.

FIG. 29 is a diagram of a definition of K1 and K2 bytes in conventional line switching. In the K1 byte, four bits (bits 1-4) define a switching request, while the other four bits (bits 5-8) define a switch request channel (switch request channel number). In the K2 byte, four bits (bits 1-4) define information of a channel switched to a standby-system channel (bridging channel number), one bit (bit 5) defines the line switching method (architecture), and three bits (bits 6-8) define the mode.

In the diagram, switching requests defined by the bits 1-4 of the K1 byte are listed in descending order. Line switching is thus carried out according to the switching request highest in priority, i.e., highest on the list. For example, Forced Switch represented by the value of the bits 1-4 "1110" is higher in priority than Manual Switch represented by "1000".

Among conventional techniques for carrying out line switching according to such a definition is a technique in which a standby-system line is allocated dynamically in a standby system in a 1-to-n redundant configuration to prevent instantaneous disconnection that occurs in a switchback process ensuing restoration from a fault to enable long hours of operation using a standby-system transmission path. The technique provides a configuration such that a standby-system line is not established statically upon the occurrence of a fault and such that a transmission path used as a standby-system path is determined dynamically based on the quality and priority of a transmission path at the time of the occurrence of a fault and restoration from the fault (see, e.g., Japanese Patent Application Laid-Open Publication No. 2001-339370).

FIG. 30 is a diagram of state transition that is made in response to a switching request based on a conventional definition. FIG. 30 depicts transition between different states, with attention being focused on switching in slots (units or lines) of the station. For convenience, only some of defined states of FIG. 29 are depicted in FIG. 30. The depicted states include No Request P1, Manual Switch P2, Signal Fail (SF) P3, and Forced Switch P4. Signal Degrade (SD), etc., is also included as a defined state.

In a state of Manual Switch P2, redundant path switching is executed automatically, irrespective of a line switching instruction by a maintenance person when a path error rate exceeds a threshold for the bit error rate specified for a state of SD or when the path enters a state of SF. In contrast, in a state of Forced Switch P4, even when the path enters the state of SD, where the path error rate is higher than the threshold for the bit error rate specified in the state of SD, or enters the state of SF, automatic redundant switching in response to such transition is not executed consequent to the Forced Switch having a higher priority than SD and SF (P4), as depicted in FIG. 29.

A problem arises, however, when removal or a fault of a unit of the transmission apparatus, or a line fault, such as the disconnection of a cable from the unit, occurs after transition to the state of Manual Switch P2 defined in FIG. 30. This is a situation, for example, where such a fault occurs when the maintenance person has set the unit to the state of Manual Switch for a given reason. This situation is equivalent to a condition for a state having a higher priority than the state of Manual Switch P2 (SF (High) P3 in FIG. 30), resulting in transition p2 (depicted in FIG. 30) to automatically clear the state of Manual Switch P2 and make transition to the state of SF (High) P3 (depicted in FIG. 30). This consequently means that the state of Manual Switch set by the maintenance person changes into another state without being noticed by the maintenance person.

After the occurrence of such a fault, when the maintenance person carries out restoration work, such as replacement of the unit, a Small Form Factor Pluggable (SFP), which is equivalent to a port and serves as an optical transmitting/receiving module mounted on the unit, an optical fiber, etc., and mounts or connects a new unit, SFP, cable, etc., the corresponding path abruptly switches back from a standby-system line to a working-system line. At this time, the maintenance person is not able to check the switchback or errors, leading to a problem in that if trouble occurs with a newly mounted unit or cable, signal disconnection occurs.

To prevent such a problem, the maintenance person may set the unit in the state of Forced Switch P4 rather than the state of Manual Switch. Although the state of Forced Switch P4 has a high priority, this state is incapable of relieving a different unit or line from a fault and may cause serious trouble if the maintenance person errantly forgets to clear the state of Forced Switch P4. It is desirable, therefore, for the state of Forced Switch P4 to not be used if possible. In this manner, dealing with a specific event may be difficult if the conventional definition of states alone is applied.

SUMMARY

According to an aspect of an embodiment, a transmission apparatus switches to a line of one standby system upon occurrence of a fault on any one of n lines of a working system. The transmission apparatus includes a switching controller that when switching from a line of the working system to a line of the standby-system upon the occurrence of the fault and executing a given command to put the line causing the fault in a given state of line switching according to the given command, causes the working system to maintain the state of line switching according to the given command even after restoration from the fault.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram of the priority of each command set for the transmission apparatus.

FIG. 7 depicts a hardware configuration of the transmission apparatus in which the ports are disposed on a shelf.

FIG. 25 is a diagram of an allocation example of the switching information K1 and K2.

FIG. 26 is another diagram of an allocation example of the switching information K1 and K2.

FIG. 27 is a diagram of an example of bit allocation for Advanced Manual Switch in the switching information K1 and K2.

FIG. 28 is a flowchart for explaining an example of a process of transmitting the switching information K1 and K2.

DESCRIPTION OF EMBODIMENTS

Preferred embodiments of the present invention will be explained with reference to the accompanying drawings. The transmission apparatus carries out 1-to-n redundant switching to execute line switching to one standby-system line when a fault occurs on any one of n working-system lines. For example, the transmission apparatus is applicable as a transmission apparatus that carries out switching operation conforming to GR-253, ITU-T Standard G. 841, etc.

Figure 1:
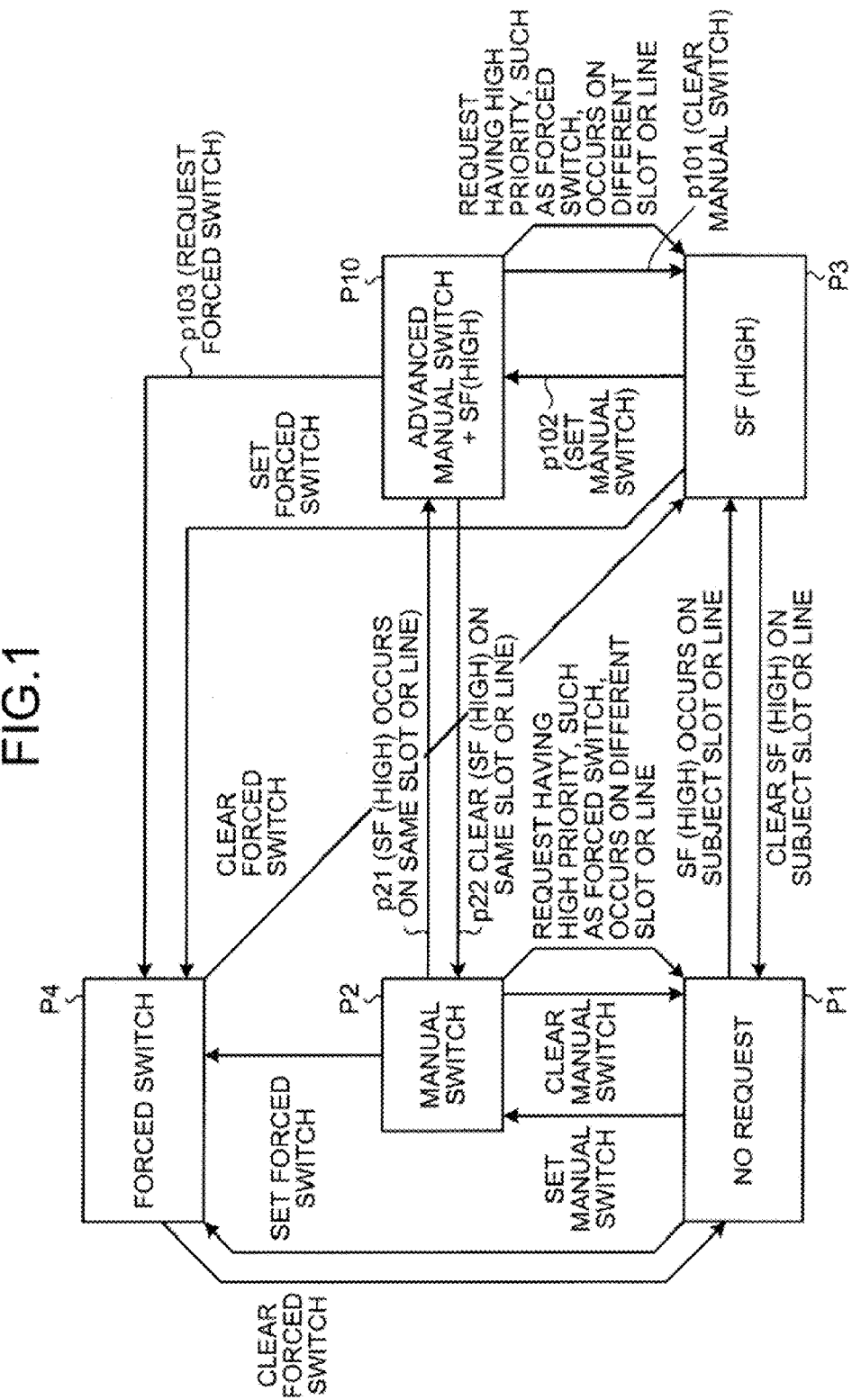
FIG. 1 is a diagram of state transition of a switching request in a transmission apparatus according to an embodiment.

FIG. 1 is a diagram of state transition of a switching request in the transmission apparatus according to an embodiment. FIG. 1 depicts transition between different states, with attention being focused on switching in slots (equivalent to units) and lines of the station. For convenience, only some major states among multiple states are depicted in FIG. 1.

Figure 30:
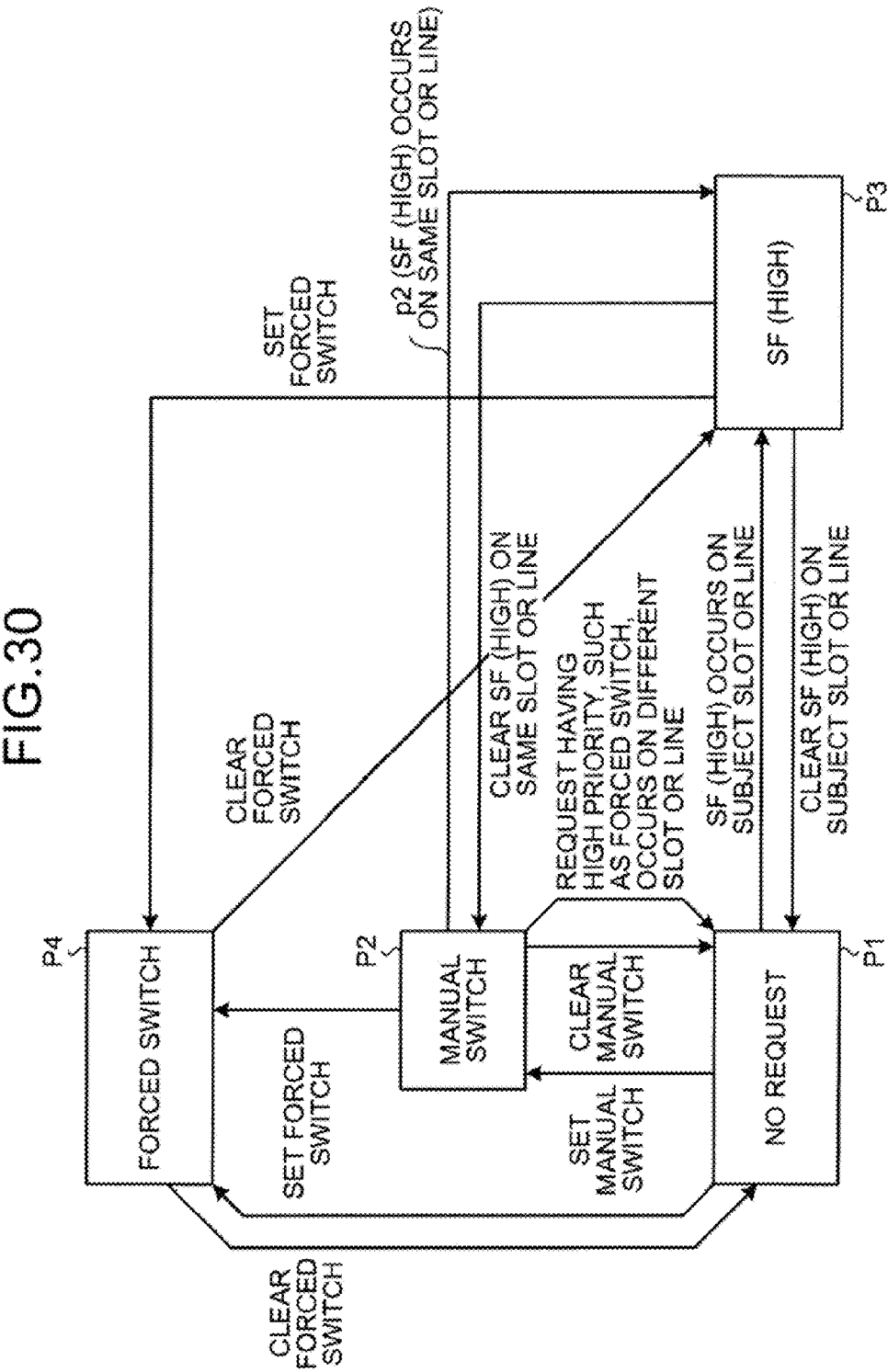
FIG. 30 is a diagram of state transition that is made in response to a switching request according to a conventional definition.

This transmission apparatus is characterized by a state of Advanced Manual Switch P10 that is added to the various commands depicted in FIG. 30 as a fault countermeasure command used in the transmission apparatus. Advanced Manual Switch P10 is added for state transition inside the transmission apparatus, and is set to have a priority that is between the priority of Manual Switch P2 and the priority of SF (High) P3.

This means that the transmission apparatus in the state of Advanced Manual Switch P10 reports its state, to an external apparatus, as the state of Manual Switch P2, and the state information indicating Manual Switch P2 is read by the external apparatus. Within the transmission apparatus, Advanced Manual Switch P10 is defined as a state that has a higher priority than the state of Manual Switch P2 (but is a state equivalent to neither Manual Switch P2 nor Forced Switch P4 inside the transmission apparatus). States and commands are set so that a state or command having a higher priority corresponds to a fault having a higher degree of seriousness.

As described, the state of Advanced Manual Switch P10 is reported to external apparatuses, as state information indicative of Manual Switch P2. In state transition within the transmission apparatus, the state of Manual Switch P2 transitions automatically to the state of Advanced Manual Switch P10 when an SF (High) fault occurs. When switching requests are made to slots or lines, the switching requests are compared between all (n) slots or lines to carry out switching that satisfying the request of highest priority to achieve line relief. This operation is specified in the communication standard provided in GR-253, ITU-T G. 841.

Addition of the state of Advanced Manual Switch P10 results in the addition of the following state transition inside the transmission apparatus. For example, if an SF (High) fault occurs on the same slot in the state of Manual Switch P2, the state of Manual Switch P2 transitions to the state of Advanced Manual Switch P10 (p21). If an SF (High) fault of the same slot is cleared in the state of Advanced Manual Switch P10, the state of Advanced Manual Switch P10 transitions to the state of Manual Switch P2 (p22). If a switching request in response to the occurrence of a fault having a higher priority, such as Forced Switch P4, is made to a different slot in the state of Advanced Manual Switch P10, the state of Advanced Manual Switch P10 transitions to the state of SF (High) P3 (p101). If the maintenance person, etc., sets the state of Advanced Manual Switch P10 in the state of SF (High) P3, the state of SF (High) P3 transitions to the state of Advanced Manual Switch P10 (p102). If a switching request is made in response to the occurrence of a Forced Switch fault in the state of Advanced Manual Switch P10, the state of Advanced Manual Switch P10 transitions to the state of Forced Switch P4 (p103).

Figure 29:
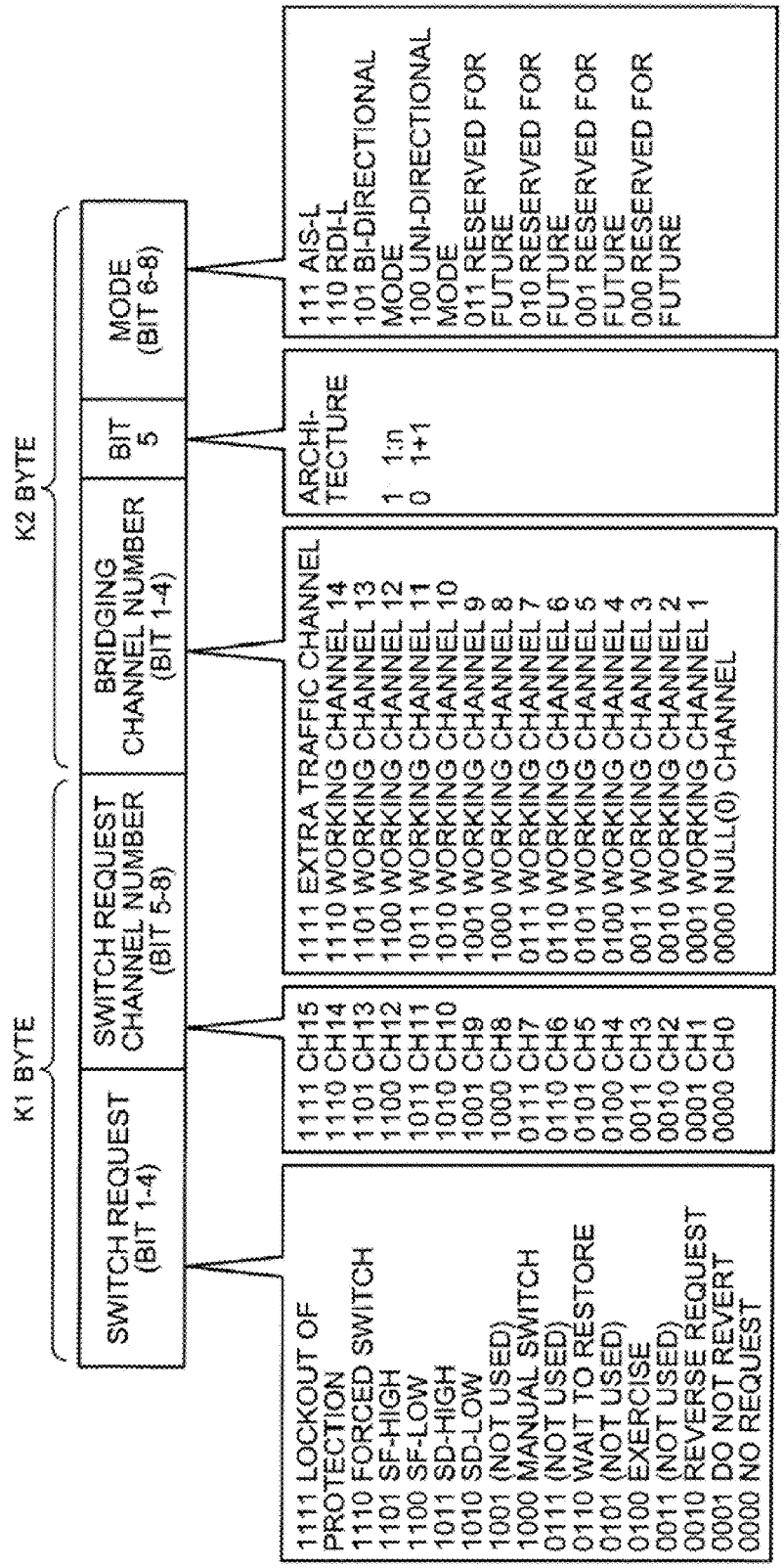
FIG. 29 is a diagram of a definition of K1 and K2 bytes in conventional line switching.

The state of Advanced Manual Switch P10 described with reference to FIG. 1 functionally combines the states of Manual Switch P2 and SF (High) P3. In this embodiment, the state of Advanced Manual Switch P10 not only has the function of SF (High) P3 of FIG. 1 but further defines the state of SF (Low), of SD (Signal Degrade) (High), and of SD (Low) depicted in FIG. 29 (which will be described in detail hereinafter).

Once transition is made from the state of Manual Switch P2 to the state of Advanced Manual Switch P10, as depicted in FIG. 1, the state of Manual Switch P2 is not cleared immediately even if a switching request is made. The state of Manual Switch P2 is not cleared until the state of Advanced Manual Switch P10 has been cleared and has transitioned back to the state of Manual Switch P2.

According to the configuration, in executing a procedure of replacing a unit or cable of the transmission apparatus in a fault-causing system, the maintenance person first carries out state switching to Manual Switch (or directly to Advanced Manual Switch, which will be described hereinafter) to switch from a working-system (work) component (unit, slot, or port) to a standby-system (protection) component. Subsequently, even if the working-system component to be replaced (SFP module on a unit or port, or connected cable) is removed, the state of Manual Switch (or Advanced Manual Switch) set in advance by the maintenance person is maintained from the perspective of external apparatuses.

As a result, when the working-system (unit or port) is restored, the transmission apparatus maintains the state of Manual Switch to prevent automatic switchback, thereby preventing unintended state switching. Even if the fault is resolved and a unit, port, cable, etc., is found to be normal, the maintenance person first confirms that the transmission apparatus has no problem and then clears the Manual Switch (Advanced Manual Switch) from outside the transmission apparatus. At this point, switchback to a working unit or port is allowed. Through this process, maintenance is carried out without causing instantaneous line disconnection or line fault.

Figure 2:
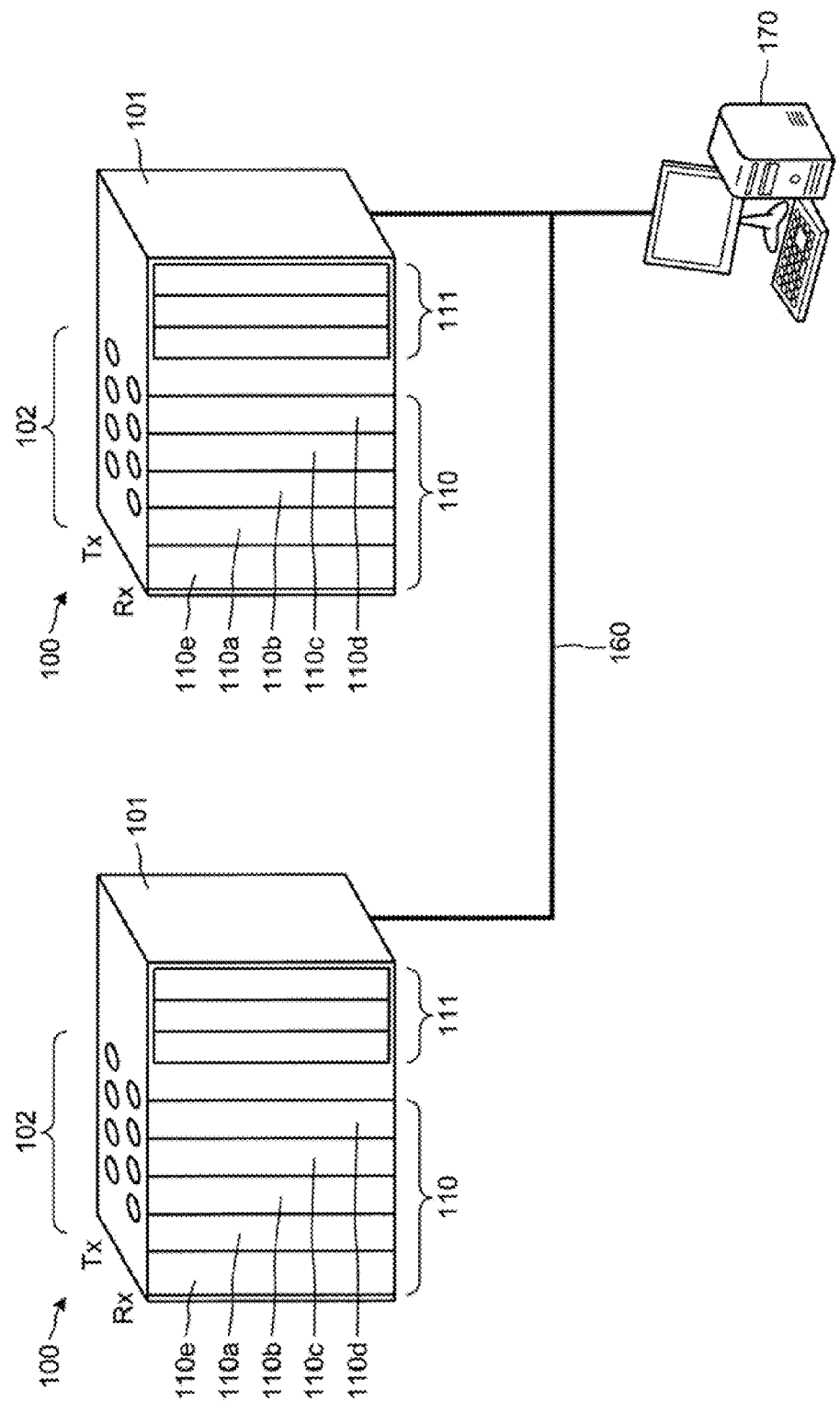
FIG. 2 is a diagram of an exemplary configuration of a transmission system incorporating the transmission apparatus.

FIG. 2 is a diagram of an exemplary configuration of a transmission system incorporating the transmission apparatus. The configuration example of FIG. 2 depicts two transmission apparatuses 100, each having a shelf 101 provided with ports 102. The shelf 101 includes an interface unit 110 that is connected to a transmission path and that is the subject of 1-to-n switching, and a control-system unit 111. The interface unit 110 includes n working-system units (4 units in FIG. 2) 110a to 110d and one standby-system unit 110e.

When a fault occurs on a working-system component (transmission path, unit, etc.), relief (protection) from the fault using a line of the standby-system unit 110e is carried out through line switching by the interface unit 110. In this configuration, the working-system ports 102 are fixed to the shelf 101. The working-system ports 102 are disposed on an upper aspect of the shelf 101, and consist of 4 transmission ports (Tx) corresponding to 4 working-system units 110a to 110d and 4 reception ports (Rx) and thus, consist of 8 ports in total. Between two of the transmission apparatuses 100, the transmission ports and the reception ports of the working-system ports 102 are connected to each other via optical fibers or electrical cables (not depicted).

The control-system unit 111 carries out cross connection control of switching a route for a signal traveling through a transmission path, 1-to-n unit switching control of switching to one standby-system transmission path upon the occurrence of a fault on any one of the n working-system transmission paths, and alarm monitoring on a transmission path and in the transmission apparatus. The control-system unit 111 includes multiple units, and is connected to a monitoring device 170, such as a PC, via a communication line 160, such as a LAN, craft cable, and USB. The monitoring device 170 monitors the state of the transmission apparatus 100, and is caused to read out state information by an input command. Upon the occurrence of a fault, the maintenance person operates the monitoring device 170 to input a switching request command to the transmission apparatus 100.

Figure 3:
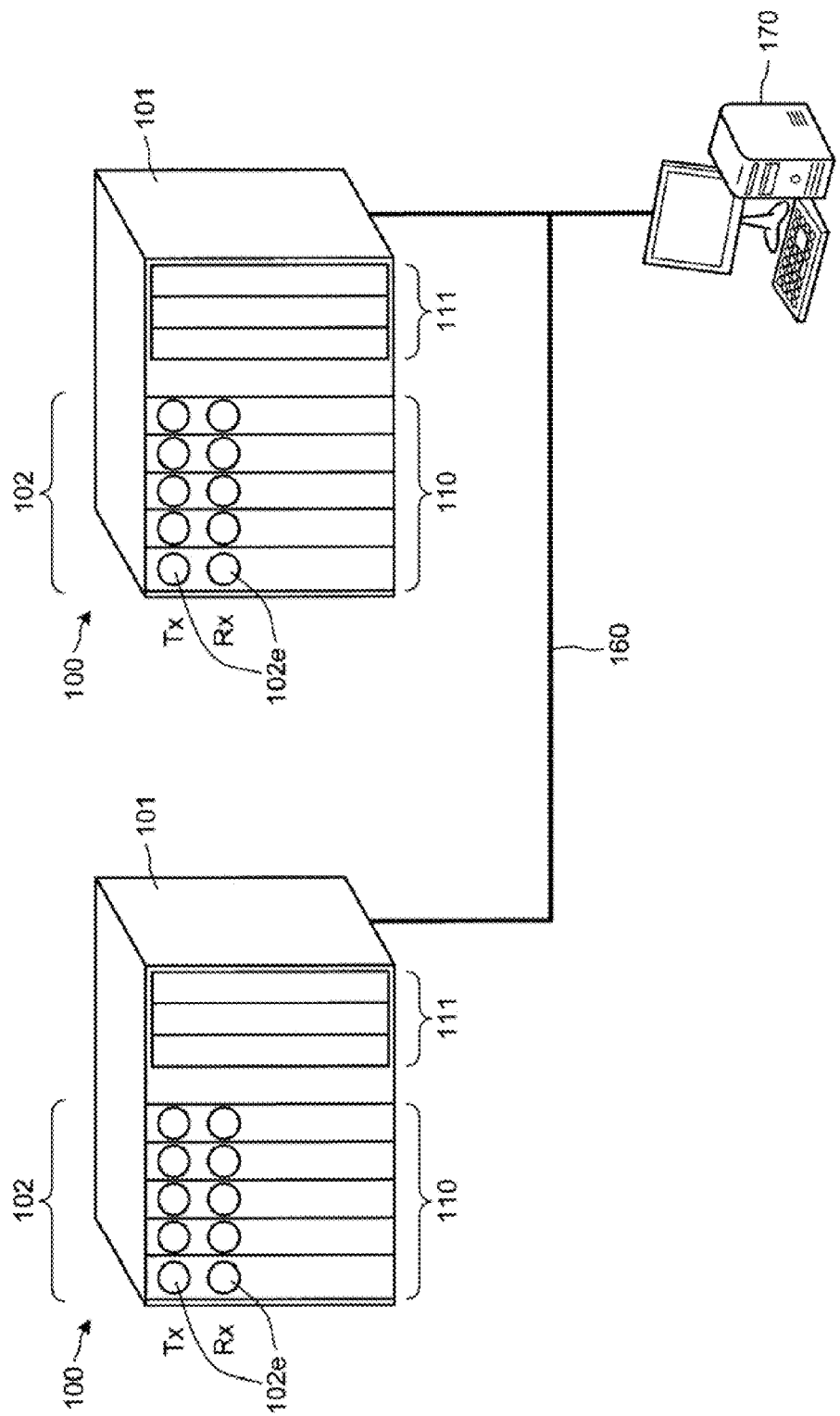
FIG. 3 is a diagram of an exemplary configuration of an optical transmission system incorporating the transmission apparatus.

FIG. 3 is a diagram of an exemplary configuration of an optical transmission system incorporating the transmission apparatus. In the configuration example depicted in FIG. 3, the ports 102 are disposed directly on the interface units 110 mounted on the shelves 101 of two of the transmission apparatuses 100. According to this configuration example, if a fault occurs on a working-system component (disconnection of a cable from the port 120, etc.), the working-system component is relieved from the fault by line switching using the standby system, where the port 102e disposed on the standby-system unit 110e is used.

Figure 4:
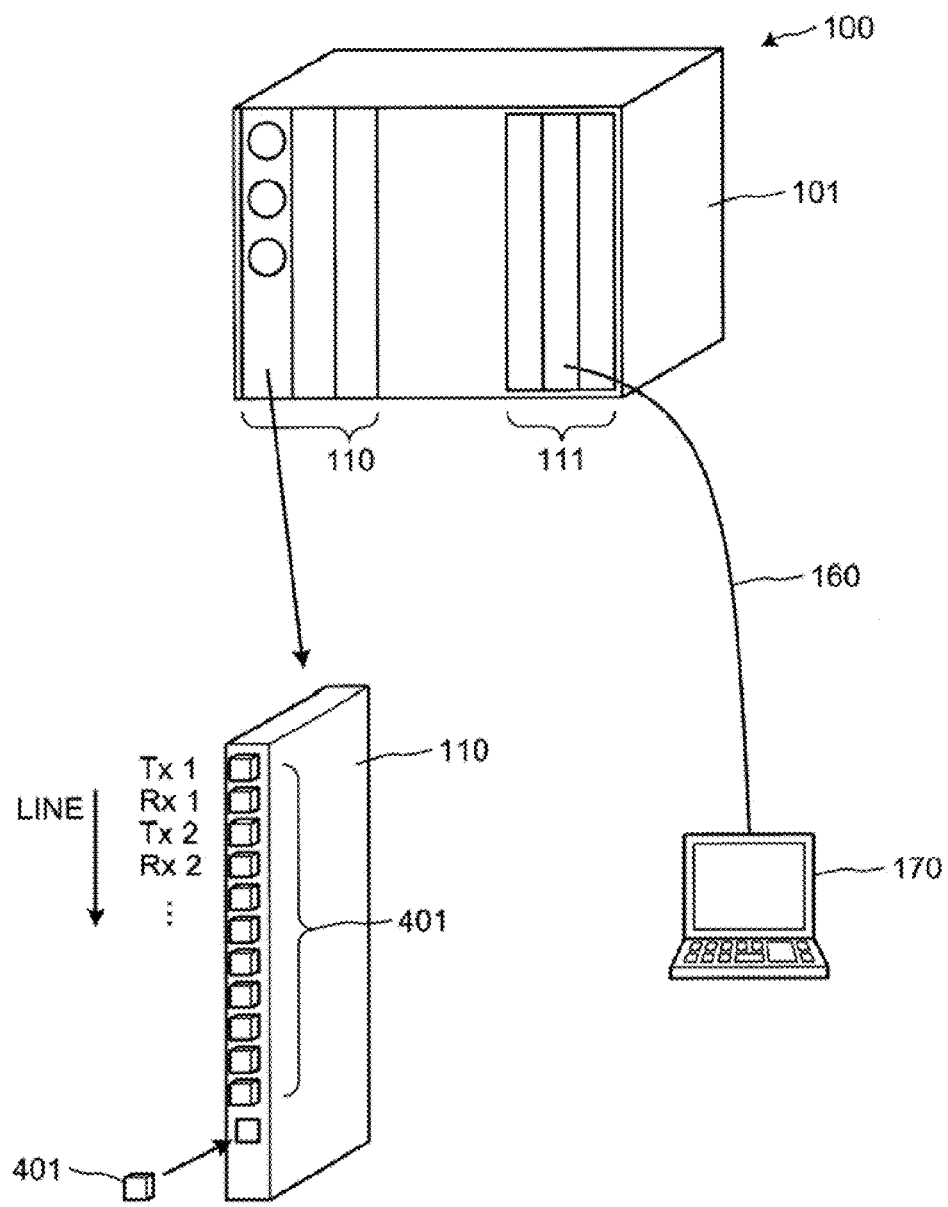
FIG. 4 is a diagram of a configuration of a unit mounted on the transmission apparatus.

FIG. 4 is a diagram of a configuration of a unit mounted on the transmission apparatus. The interface unit 110 placed in a slot of the shelf 101 of the transmission apparatus 100 is connected to the control-system unit 111 inside the shelf 101. The control-system unit 111 collects information concerning the state of the interface unit 110, etc., through a built-in CPU and a state monitoring program running on the CPU, and is capable of setting operation, such as unit switching on the interface unit 110, based on a command sent from the monitoring device 170. The interface unit 110 has multiple removable transmitting/receiving modules 401 of Small Form Factor Pluggable (SFP) type that are equivalent to the ports. Multiple lines are arranged on the interface unit 110 to form rows from an upper part to a lower part thereof, and pairs including a transmitting SFP (Tx) and a receiving SFP (Rx) are arranged on the lines.

Figure 5:
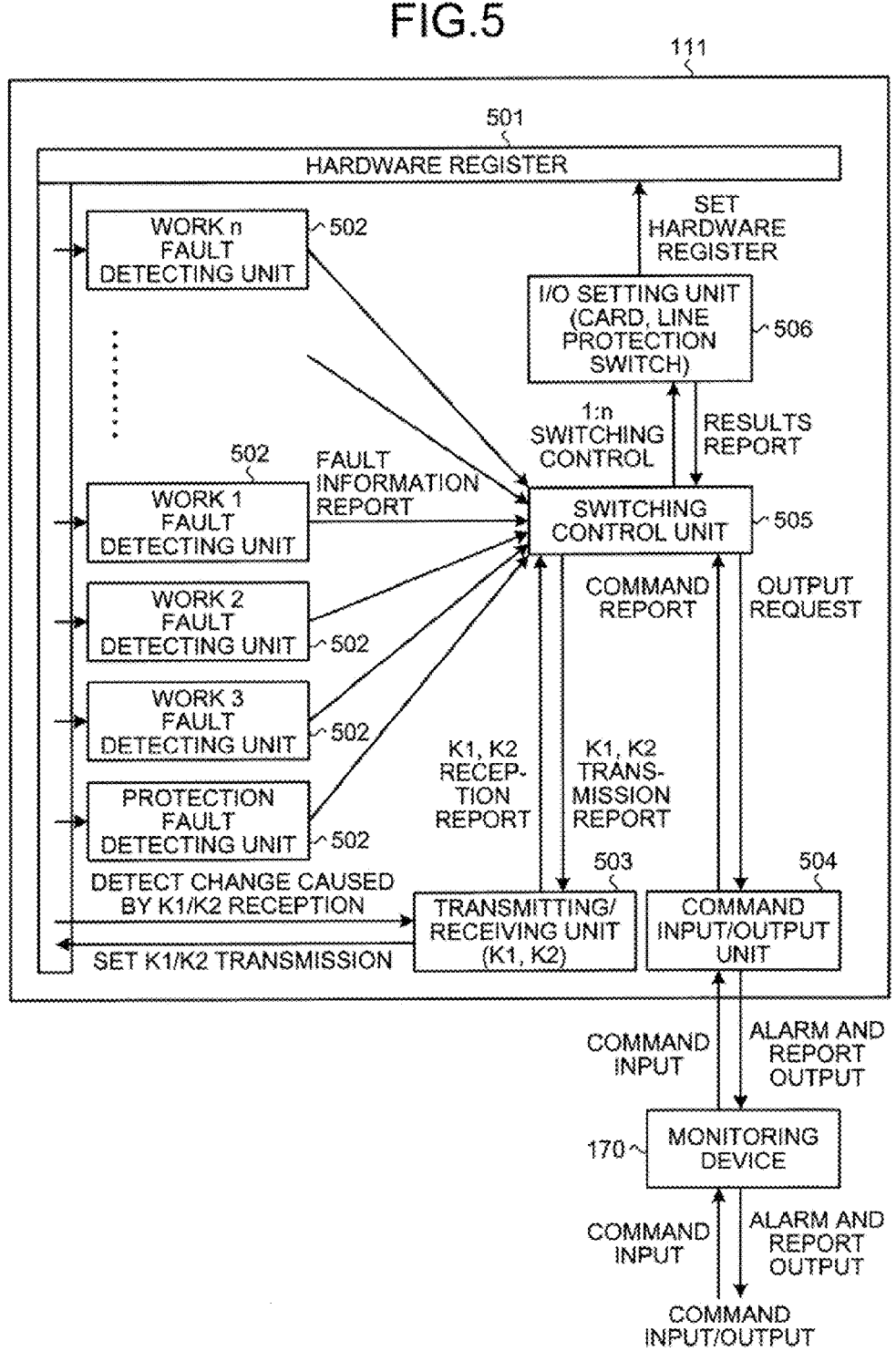
FIG. 5 is a block diagram of an internal configuration of a control-system unit.

FIG. 5 is a block diagram of an internal configuration of the control-system unit. The control-system unit 111 carries out detection of a fault on a transmission path or unit and 1-to-n line switching control upon occurrence of a fault. The control-system unit 111 controls the interface unit 110 based on a command sent from the monitoring device 170, and outputs to the monitoring device 170, an alarm and report concerning the fault and operation state. The following constituent units each include a CPU, a memory, an I/O port, a hardware (HW)

register, etc. The CPU executes a switching control program to carry out unit switching upon the occurrence of a fault.

Fault information from n working-system interface units 110a to 110d and one standby-system interface unit 110e is detected by fault detecting units 502, respectively corresponding to the interface units 110 via a hardware register 501. A transmitting/receiving unit 503 detects switching information K1 and K2 bytes. An input command given by an operator operating the monitoring device 170 is input via a command input/output unit 504. Detected information and input information are output to a switching control unit (switching controller) 505.

The switching control unit 505 determines the switching state of highest priority based on the input information, and carries out processes of setting switching control on the hardware register 501 via the I/O setting unit 506, transmitting the switching information K1 and K2 bytes via the transmitting/receiving unit 503, and outputting an alarm and report to the monitoring device 170 via the command input/output unit 504.

FIG. 6 is a diagram of the priority of each command set for the transmission apparatus. For comparison, conventionally used commands are also included in the diagram. According to the priority setting depicted in FIG. 6, definitions of Advanced Manual Switch are added between Manual Switch set to have low priority order and Forced Switch set to have high priority order.

Advanced Manual Switch is set with respect to a definition of SF and to a definition of SD, thus is set to have priority that is one rank lower than that of SF and SD. For example, Advanced Manual Switch+SF (High) P10a is set between SF (High) P3a and SF (Low) P3b, Advanced Manual Switch+SF (Low) P10b is set between SF (Low) P3b and SD (High) P3c, and Advanced Manual Switch+SD (High) P10c is set between SD (High) P3c and SD (Low) P3d, and Advanced Manual Switch+SD (Low) P10d is set between SD (Low) P3d and Manual Switch P2.

The overall priority order is thus set in this order of priority: Forced Switch P4>SF (High) P3a>Advanced Manual Switch+SF (High) P10a>SF (Low) P3b>Advanced Manual Switch+SF (Low) P10b>SD (High) P3c>Advanced Manual Switch+SD (High) P10c>SD (Low) P3d>Advanced Manual Switch+SD (Low) P10d>Manual Switch P2. Newly set commands of Advanced Manual Switch 10P (P10a to P10d) are given by newly carrying out bit setting #1 to #4 for the K1 and K2 bytes so that the commands do not overlap other commands (which will be described in detail hereinafter).

FIG. 7 depicts a hardware configuration of the transmission apparatus in which the ports are disposed on the shelf. In the example, the ports 102 are disposed on the shelf 101, as depicted in FIG. 2 and the working-system interface units 110 (110a to 100d) are execute line switching to the standby-system interface unit 110e by switching selectors 701 and 702. In this configuration example, the working-system ports 102 fixed to the shelf 101 are used. Reference numeral 703 in FIG. 7 denotes a matrix switch, which is disposed on the control-system unit 111 and switches a route for a signal from a transmission path to input/output the signal.

Figure 8:
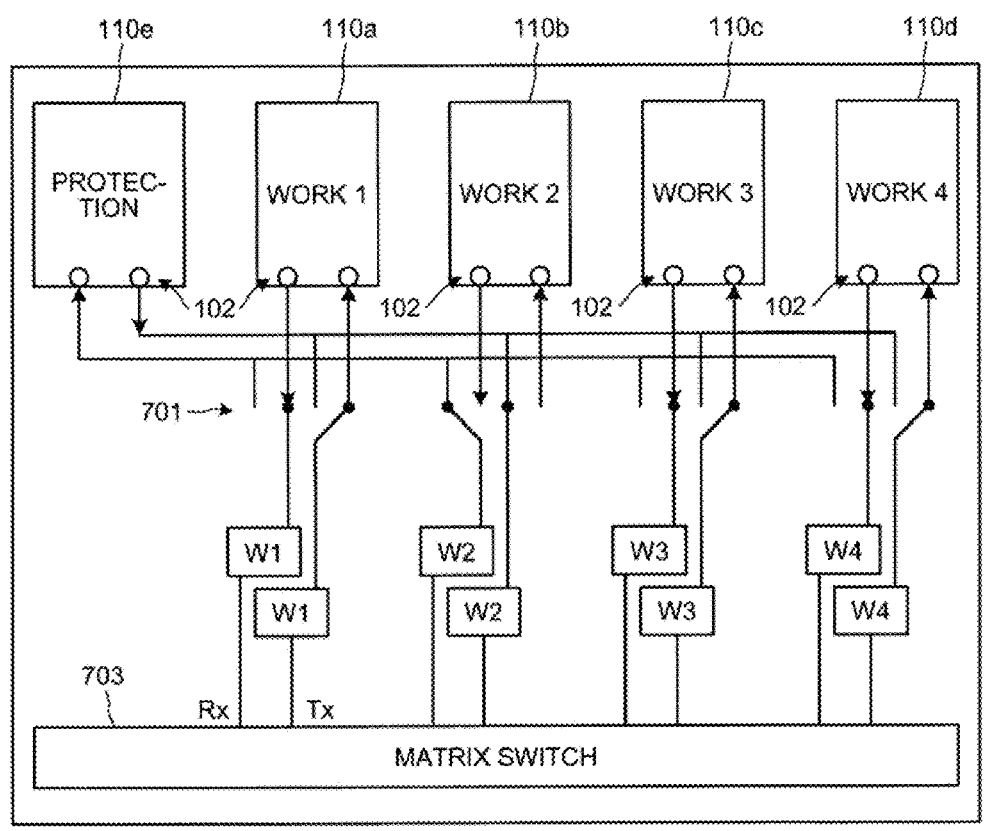
FIG. 8 depicts a hardware configuration of the transmission apparatus in which the ports are disposed on the interface units.

FIG. 8 depicts a hardware configuration of the transmission apparatus in which the ports are disposed on the interface units. The configuration is an example of the ports 102 being disposed on the interface units 110 (110a to 110e), as depicted in FIG. 2. In this case, the interface units 110 (110a to 100d) are able to execute line switching to the standby-system interface unit 110e by switching one selector 701.

Figure 9:
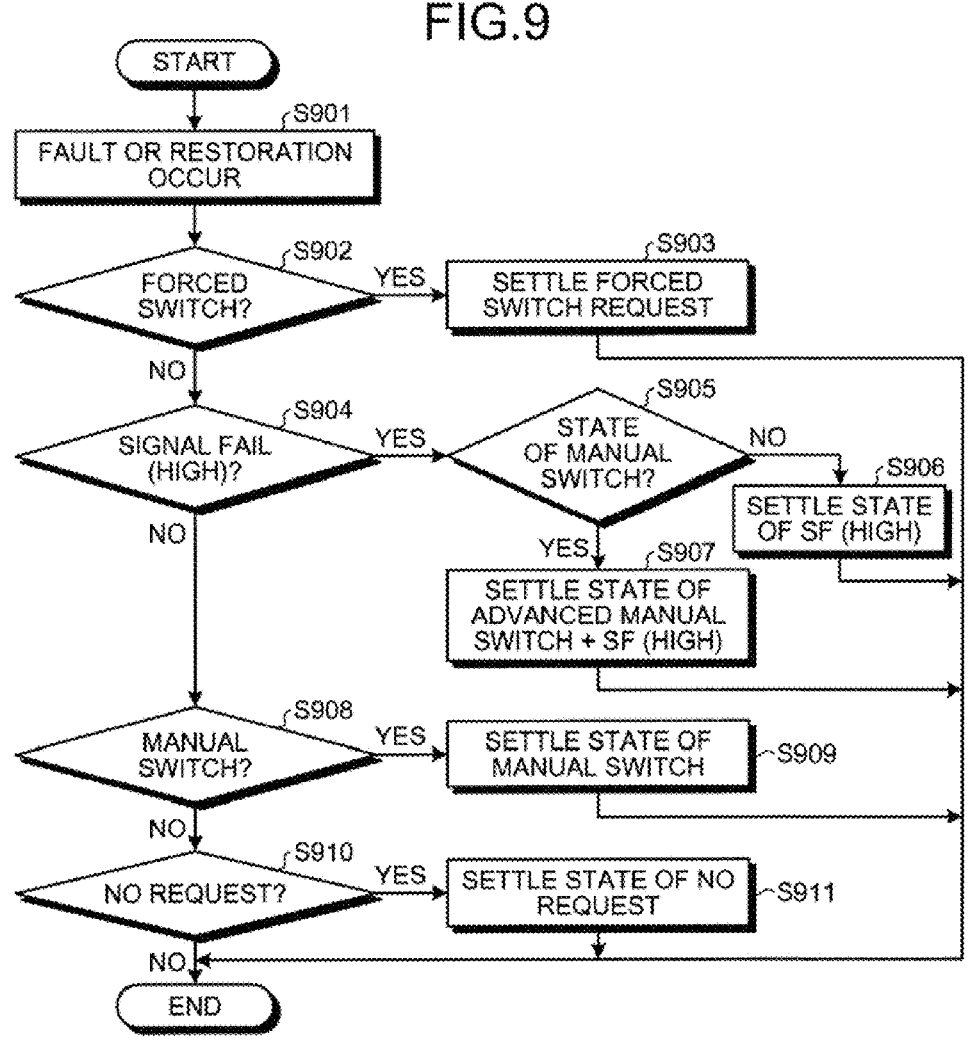
FIG. 9 is a flowchart of a state switching process by each interface unit.

FIG. 9 is a flowchart of a state switching process by each interface unit. The flowchart depicts operations that are carried out until a state for each interface unit 110 becomes determinate, when a switching request command based on the manipulation of the monitoring device 170 by a maintenance person is input to the interface units 110. If a fault or restoration from a fault occurs on a working-system interface unit 110 (step S901), the following operations are carried out sequentially from commands higher in priority until the states become determinate.

For example, if a switching request input in response to the occurrence of a fault is Forced Switch having a high priority (step S902: YES), a Forced Switch request is settled (step S903). If the switching request is not Forced Switch (step S902: NO), whether the switching request is SF (High) is determined (step S904). If the switching request is SF (High) (step S904: YES), whether the current state is the state of Manual Switch is determined (step S905). If the current state is not the state of Manual Switch (step S905: NO), the state of SF (High) is settled (step S906). If the current state is the state of Manual Switch (step S905: YES), the state of Advanced Manual Switch+SF (High) is settled (step S907).

If the switching request is not SF (High) at step S904 (step S904: NO), whether the switching request is Manual Switch is determined (step S908). If the switching request is Manual Switch (step S908: YES), the state of Manual Switch is settled according to the switching request (step S909). If the switching request is not Manual Switch (step S908: NO), whether the switching request is No Request is determined (step S910). If the switching request is No Request (step S910: YES), the state of No Request is settled according to the switching request (step S911). This process includes additional steps related to newly set Advanced Manual Switch (steps S904 to S907).

Figure 10:
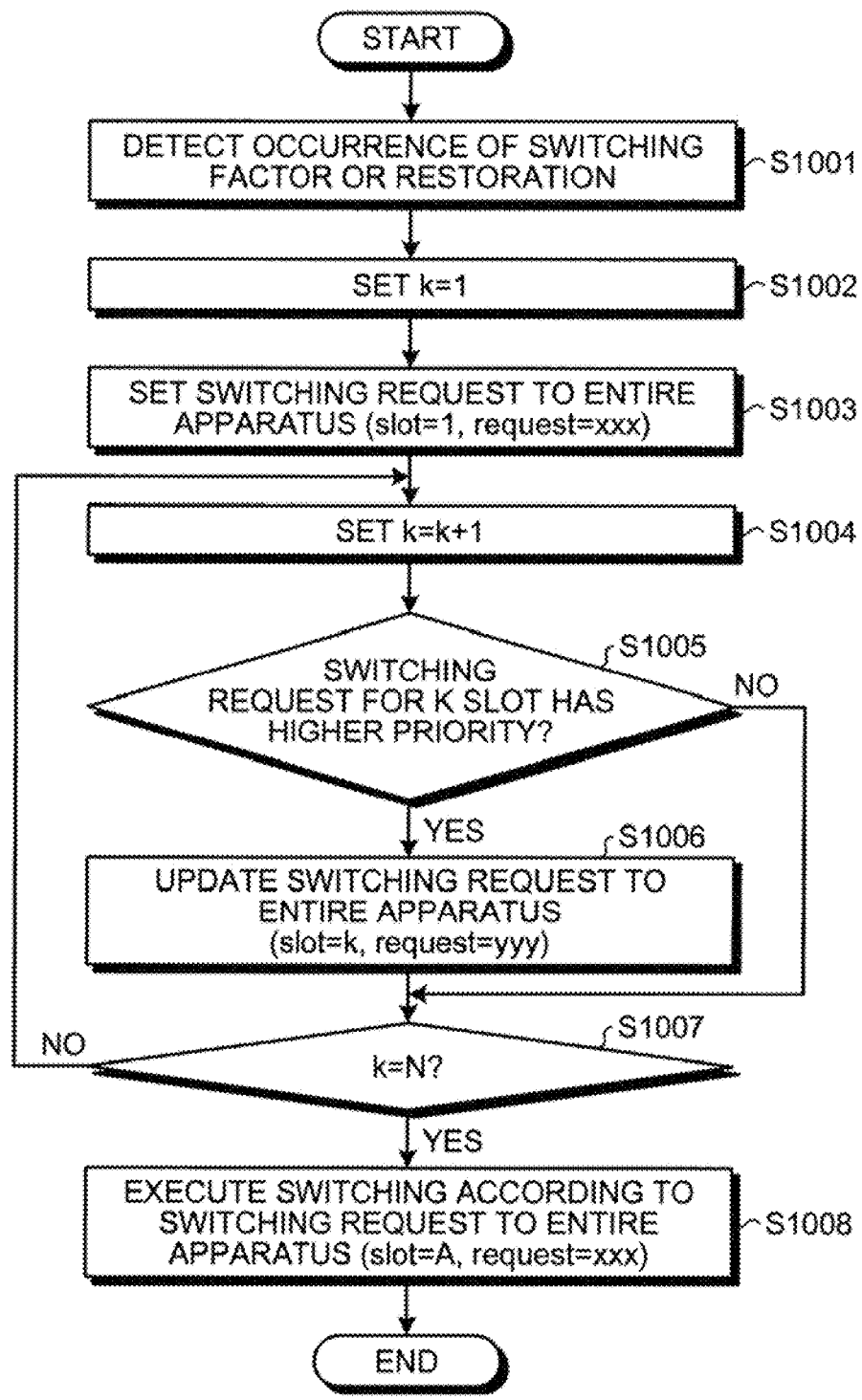
FIG. 10 is a flowchart of a switching process carried out by the entire the transmission apparatus.

FIG. 10 is a flowchart of a switching process carried out by the entire the transmission apparatus. The shelf 101 has n slots into which the interface units 110 are placed, and the switching control unit 505 of FIG. 5 detects each switching request to each slot to process switching requests in descending order of priority.

For example, when detecting the occurrence of a switching factor or restoration corresponding to a fault or restoration occurring on the interface units 110 (step S1001), the switching control unit 505 executes the following operations. First, a constant k representing the number of switching requests is set to 1 (step S1002) to set a switching request to be executed by the entire apparatus (step S1003). At this time, the slot number of the slot subject to the switching request and a state subject to the switching request (e.g., SF-High, etc.) are set.

The constant k is then incremented by 1 (step S1004), and it is determined whether the switching request for a different slot (k slot) has a higher priority as a command (step S1005). If the switching request for the different slot (k slot) has a higher priority (step S1005: YES), the switching request to the entire apparatus set at step S1003 is updated (step S1006). As a result of the updating, the slot number of the different slot having a higher priority and the state subject to the switching request are set.

If the switching request for the different slot (k slot) does not have a higher priority (step S1005: NO), the switching request setting is not updated, maintaining the setting made at step S1003. Subsequently, whether all n slots (k=n) have been processed through a series of the operations is determined (step S1007). If all slots have not been processed (step S1007: NO), the process flow returns to step S1004, at which another slot is processed. If the processing of all the slots has been completed at step S1007 (step S1007: YES), switching requests to the entire apparatus having n slots have been set.

Hence, actual line switching (state transition) is carried out (step S1008), after which the process is ended.

Figure 11:
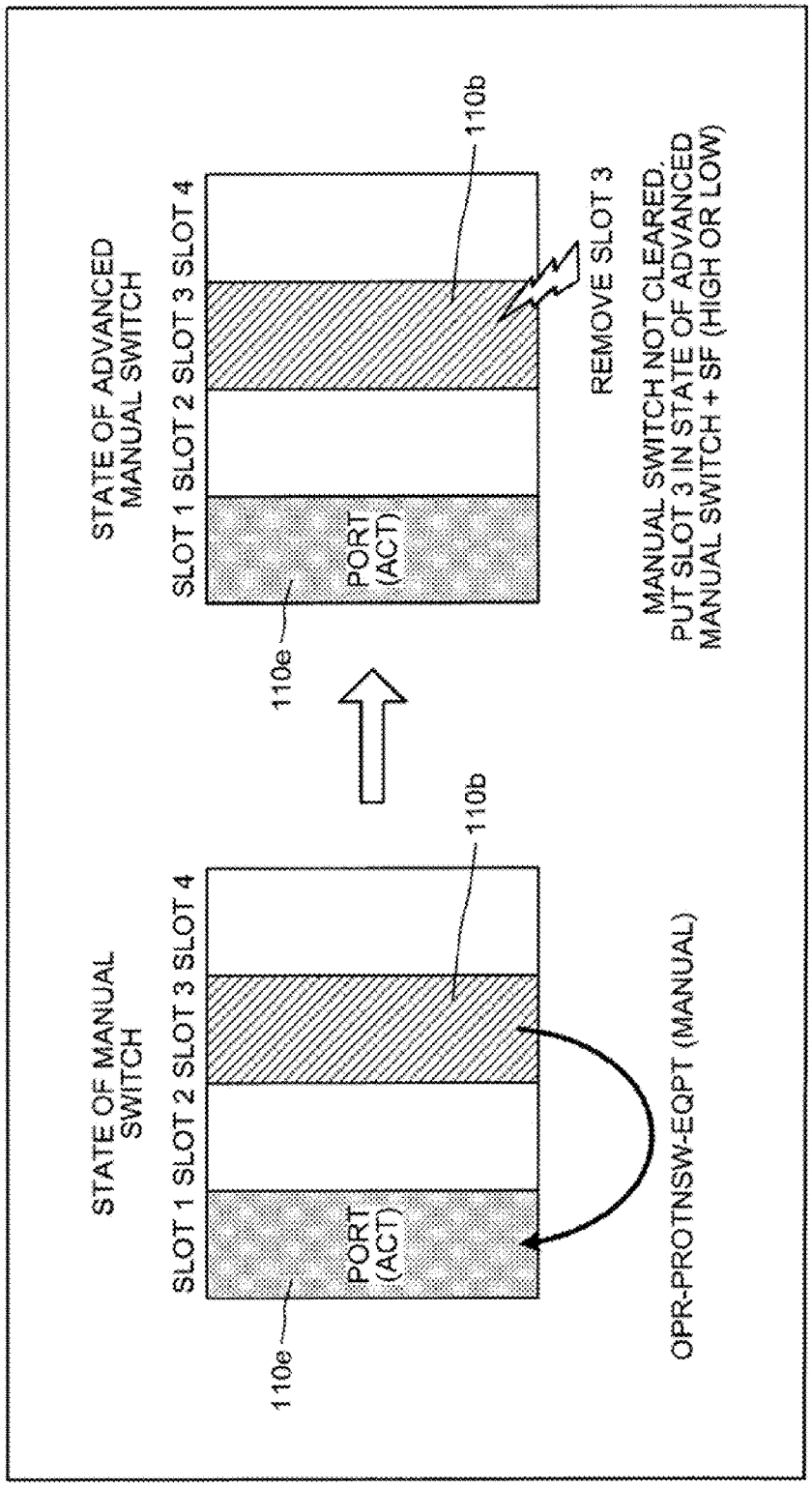
FIG. 11 is a diagram of an example of an interface unit being removed from a slot executing Manual Switch.

A first example describes carrying out line switching at the unit-level in the transmission apparatus of FIG. 2 will be described. FIG. 11 is a diagram of an example of an interface unit being removed from a slot executing Manual Switch. An example in which a fault occurs on the working-system interface unit 110b in the slot 3 of the shelf 101 is explained.

In this example, a switching request command "OPR-PROTNSW-EQPT (Manual)" for Manual Switch is input from the monitoring device 170 with the working-system interface unit 110b in a normal, mounted state in the slot 3. Subsequently, even if the interface unit 110b is removed from the slot 3, the state of Manual Switch of the slot 3 is not cleared but rather, continues. The monitoring device 170 external to the transmission apparatus is able to read out the state of Manual Switch using a command "RTRV-COND-ALL" to check an alarm and the state of the transmission apparatus.

In this situation, the slot 3 inside the transmission apparatus enters the state of Advanced Manual Switch+SF (High) or of SF (Low), but remains in the state of Manual Switch from the perspective of external apparatuses. The slot 3 thus maintains the state of Manual Switch with respect to external apparatuses even if the interface unit 110b is disconnected from the slot 3 or fails, or is mounted incorrectly.

Figure 12:
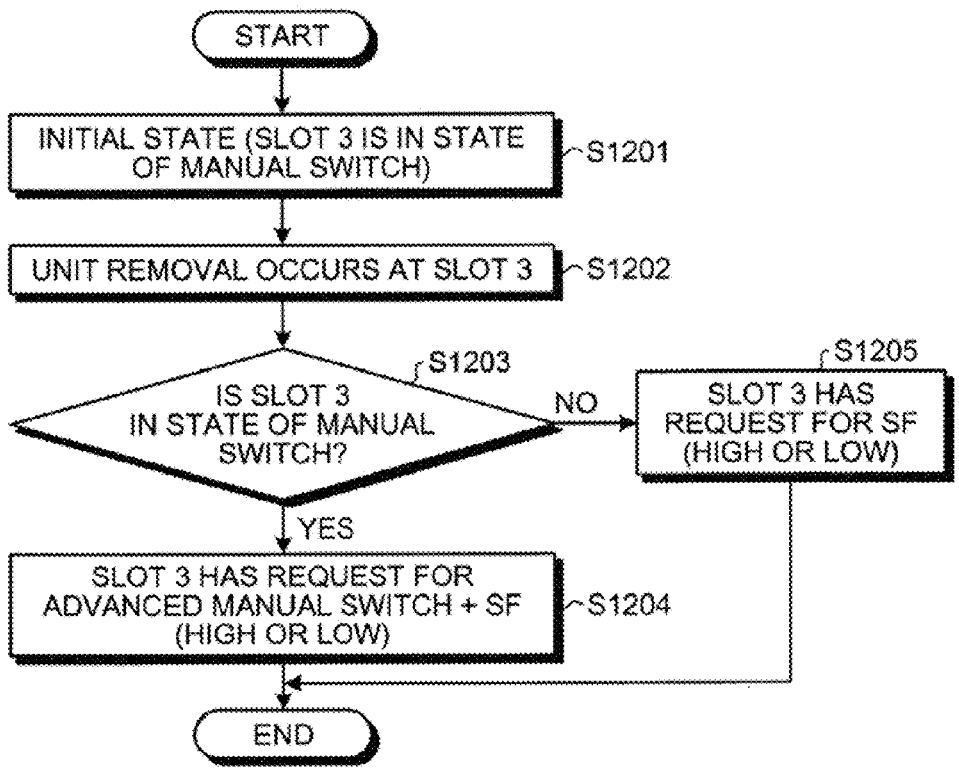
FIG. 12 is a flowchart of a process of state switching depicted in FIG. 11.

FIG. 12 is a flowchart of a process of state switching depicted in FIG. 11. It is assumed that the slot 3 is initially in the state of Manual Switch (step S1201). Following the initial state, although removal of the interface unit 110b from the slot 3 (step S1202) leads to the state of SF (High) or of SF (Low), if the slot 3 is in the state of Manual Switch (step S1203: YES) at this point, the slot 3 requests for switching to the state of Advanced Manual Switch+SF (High or Low) inside the transmission apparatus (step S1204). If the slot 3 is not in the state of Manual Switch (step S1203: NO), the slot 3 requests for switching to the state of SF (High or Low) (step S1205).

Figure 13:
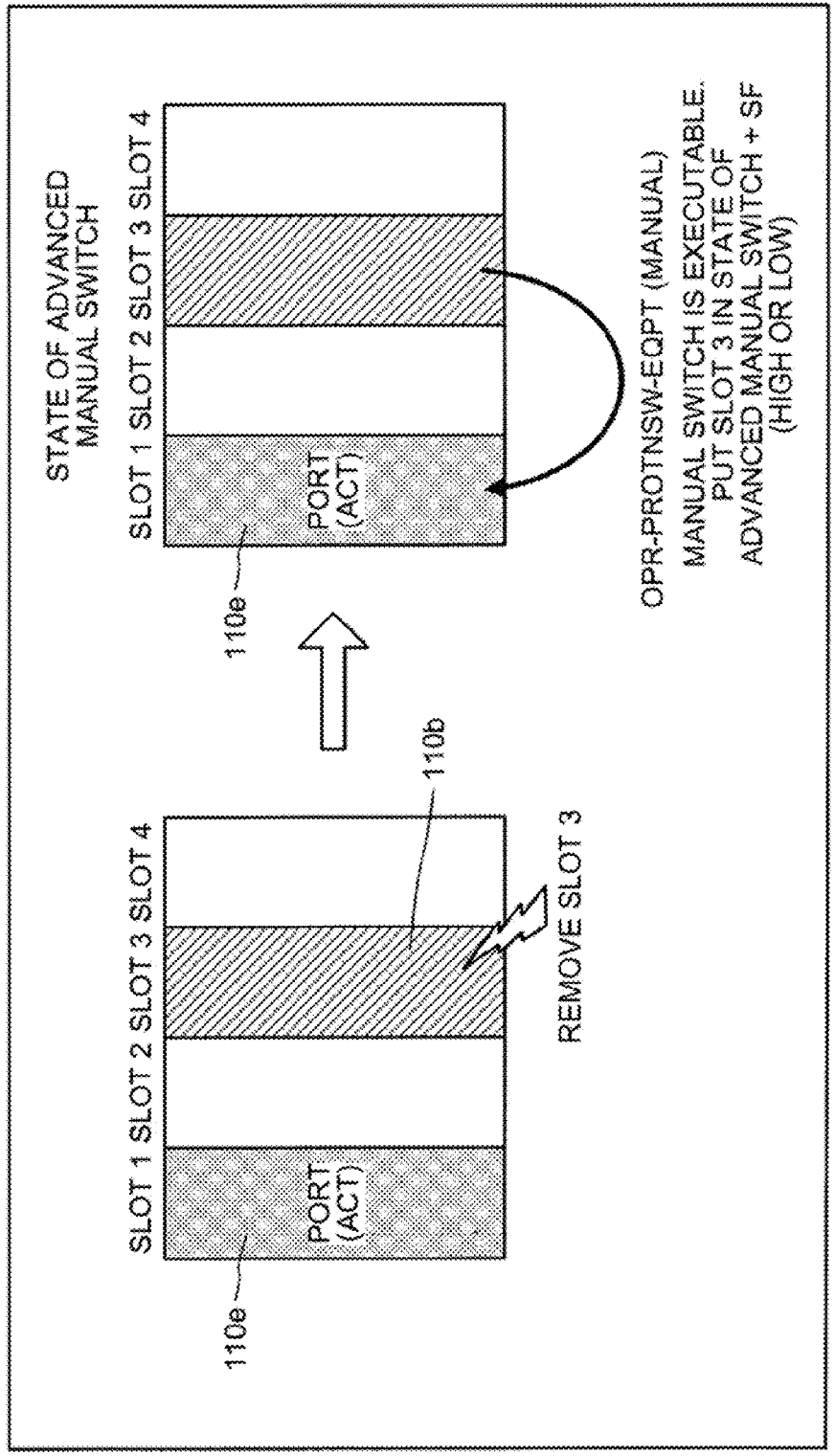
FIG. 13 is a diagram of an example of removing an interface unit from a slot and then executing Manual Switch on the slot.

FIG. 13 is a diagram of an example of removing an interface unit from a slot and then executing Manual Switch on the slot. Similar to FIG. 11, an example where a fault occurs on the working-system interface unit 110b placed in the slot 3 of the shelf 101 is explained.

It is assumed that a fault (EQPT fault on FLT, RMV, MEA, etc.) occurs on the interface unit 110b placed in the working-system slot 3. The maintenance person removes the interface unit 110b to switch lines to the interface unit 110e of the standby-system slot 1. Even after this, the command "OPR-PROTNSW-EQPT (Manual)" for Manual Switch is input from the monitoring device 170 to the slot 3 in the same manner as in the example of FIG. 11 to be able to execute state switching. In this case, from the perspective of external apparatuses, the slot 3 remains in the state of Manual Switch, which allows the monitoring device 170 to read out the state of Manual Switch using the command "RTRV-COND-ALL". Meanwhile, inside the transmission apparatus, the slot 3 enters the state of Advanced Manual Switch+SF (High or Low).

Subsequently, even if the interface unit 110b is removed from the slot 3, the state of Manual Switch of the slot 3 is not cleared but rather, continues. Inside the transmission apparatus from which the unit has been removed, switching to the state of Advanced Manual Switch+SF (High or Low) is requested, so that switching occurs inside the transmission apparatus according to the switching request. After remounting of the interface unit 110b, state transition is made to the state of Manual Switch. According to a conventional technique, Manual Switch is cleared at the point that the interface unit 110b is removed upon occurrence of the fault.

Figure 14:
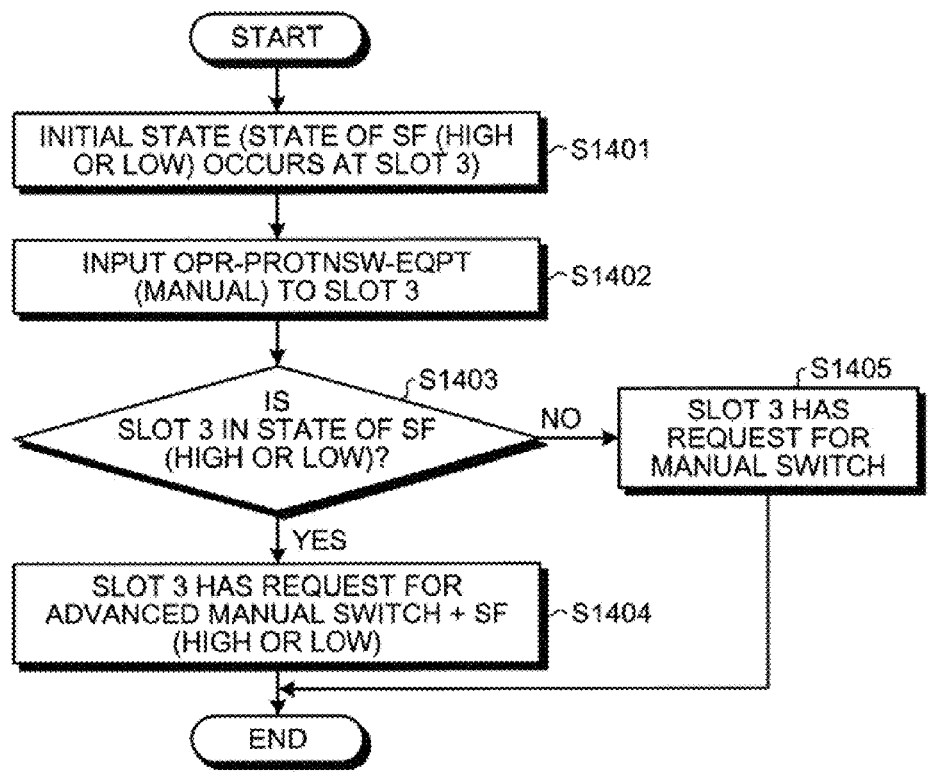
FIG. 14 is a flowchart of a process of the state switching depicted in FIG. 13.

FIG. 14 is a flowchart of a process of the state switching depicted in FIG. 13. It is assumed that initially, the interface unit 110b is removed from the slot 3 to bring about the state of SF (High or Low) (step S1401) and then the command for causing the state of Manual Switch is input to the slot 3 (step S1402). In this case, when the slot 3 is in the state of SF (High or Low) (step S1403: YES), the slot 3 requests switching to the state of Advanced Manual Switch+SF (High or Low) (step S1404). When not in the state of SF (High or Low) (step S1403: NO), the slot 3 requests switching to the state of Manual Switch (step S1405).

Figure 15:
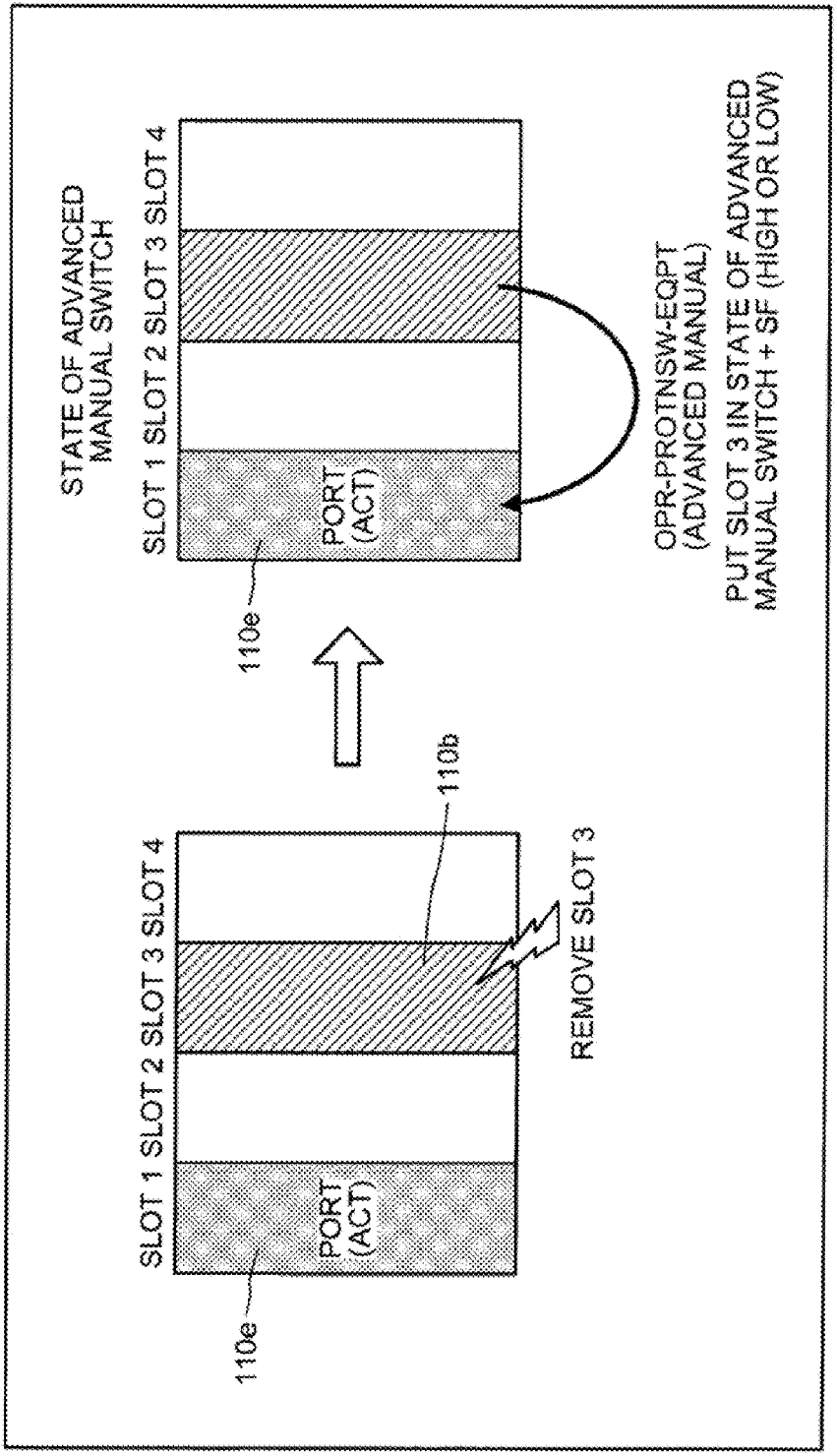
FIG. 15 is a diagram of an example of removing an interface unit from a slot and then executing Advanced Manual Switch on the slot.

FIG. 15 is a diagram of an example of removing an interface unit from a slot and then executing Advanced Manual Switch on the slot. Different from the case of specifying switching to the state of Manual Switch using the command "OPR-PROTNSW-EQPT (Manual)", switching to the state of Advanced Manual Switch may be input directly using a command "OPR-PROTNSW-EQPT (Advanced Manual)", as depicted in FIG. 15.

Figure 16:
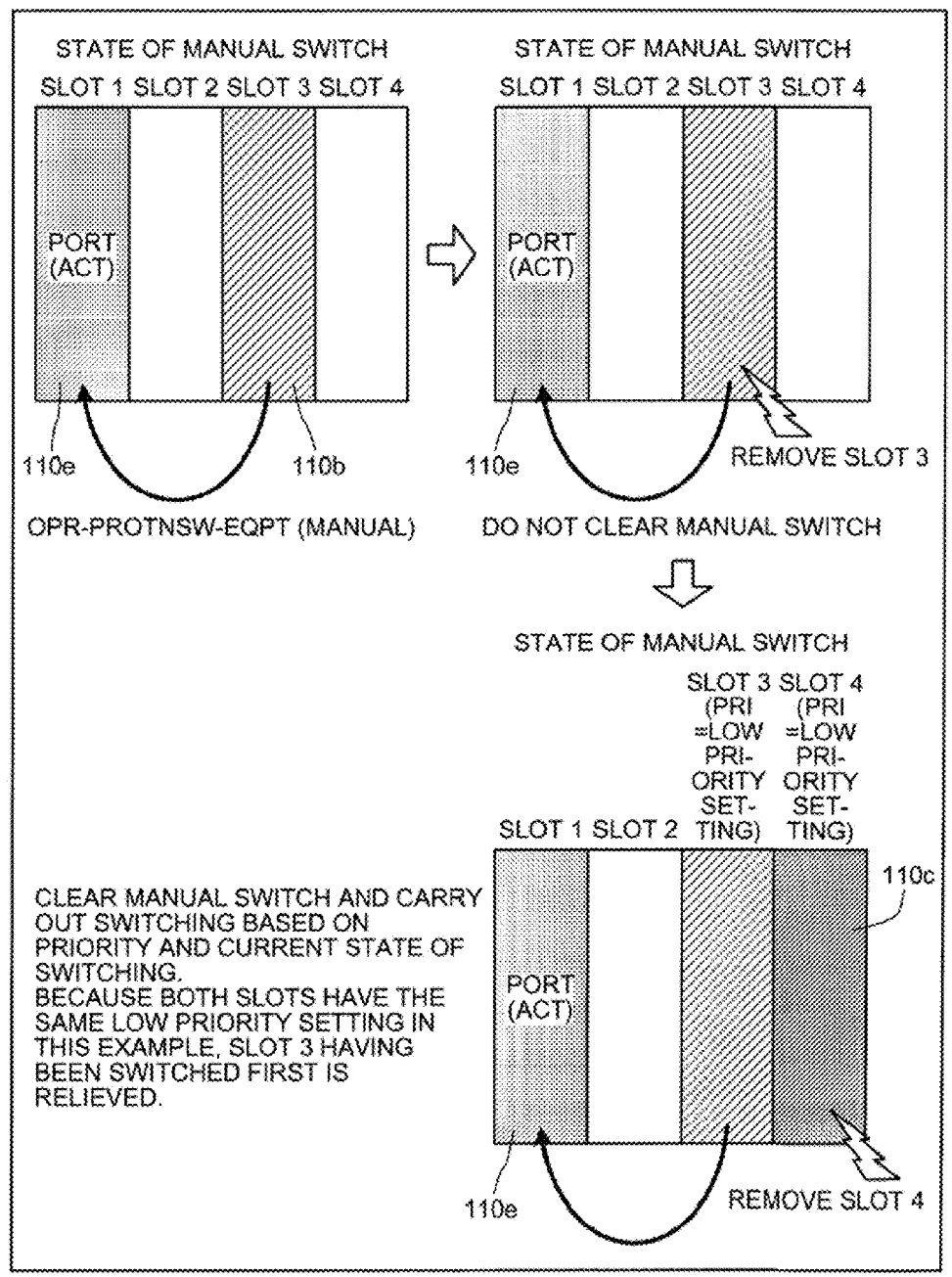
FIG. 16 is a diagram of an example of removal of an interface unit from a different slot after execution of Manual Switch.

FIG. 16 is a diagram of an example of removal of an interface unit from a different slot after execution of Manual Switch. If a fault occurs on the interface unit 110b placed in the working-system slot 3 and line switching has been made to the interface unit 110e of the standby-system slot 1, the command "OPR-PROTNSW-EQPT (Manual)" for causing the state of Manual Switch is input to the working-system slot 3 to put the slot 3 in the state of Manual Switch. Subsequently, even if the interface unit 110 is removed from the slot 3, the slot 3 maintains the state of Manual Switch in the same manner as described above. Following this, if a fault occurs on a working-system slot 4 different from the slot 3, the state of Manual Switch is cleared and relief operation is carried out according to the priority set for the slots 3 and 4. If the priority (PRI=High/Low) set for the slots 3 and 4 are the same (Low), as depicted in FIG. 16, the slot 3 having been switched first is given priority in relief operation to continue.

Figure 17:
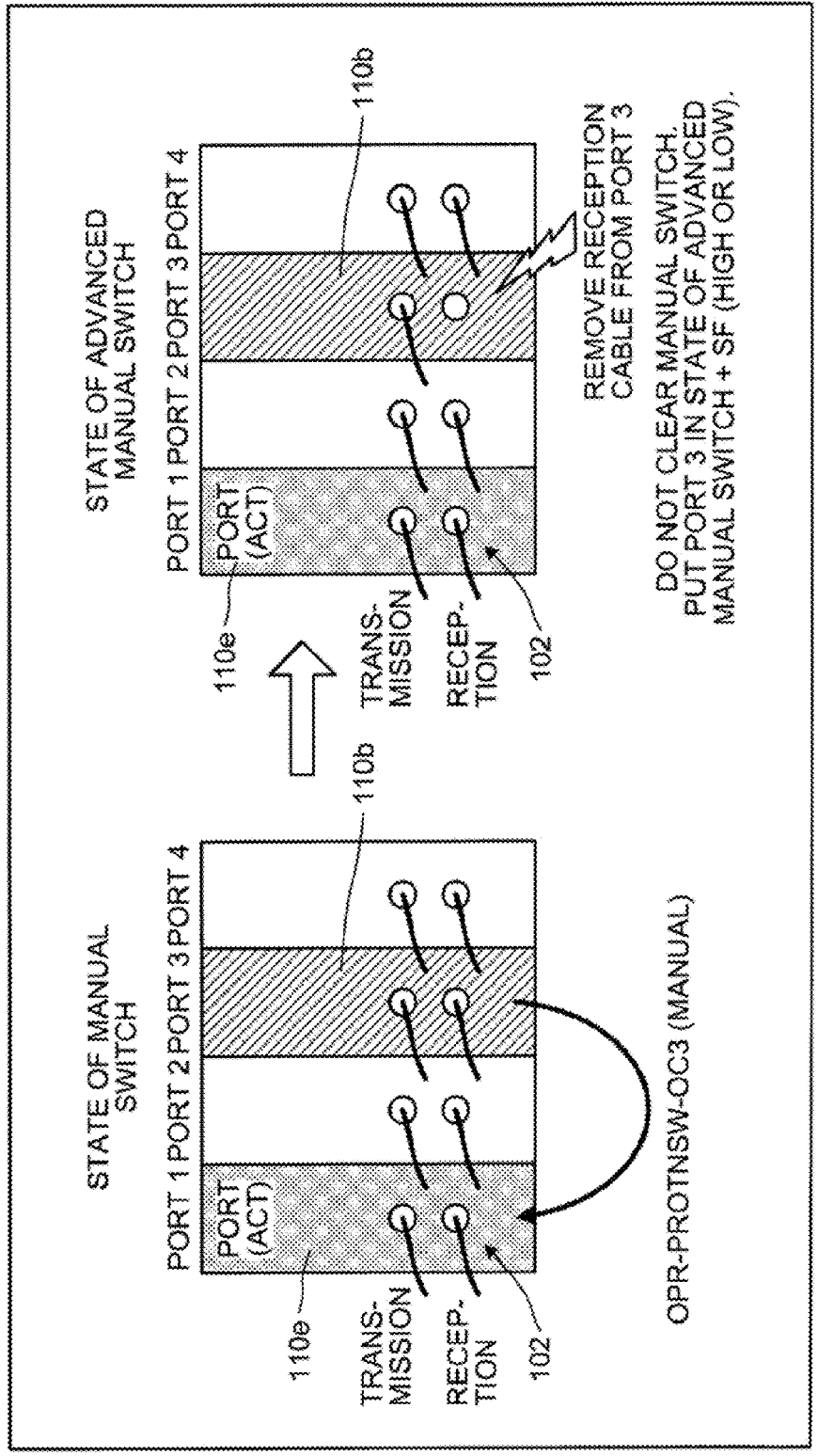
FIG. 17 is a diagram of an example of cable detachment from a port executing Manual Switch.

A second example describes executing line switching at the line-level in the transmission apparatus of FIG. 3 will be described. FIG. 17 is a diagram of an example of cable detachment from a port executing Manual Switch. The slot 3 of the shelf 101 is provided with the working-system interface unit 110b. An example of a fault resulting from cable detachment at the port 102 of the slot 3 is described.

In this example, it is assumed that a working-system port 3 is normal and in a state of No alarm. A switching request command "OPR-PROTNSW-OC3 (Manual)" for Manual Switch is input from the monitoring device 170. After this, even if a cable connected to the port 3 is pulled out or a fault equivalent to SF (High), SF (Low), SD (High), SD (Low), etc. occurs, the state of Manual Switch is not cleared but rather, continues. The monitoring device 170 is able to read out the state of Manual Switch using a state checking command "RTRV-COND-ALL". In this condition, inside the transmission apparatus, switching to Advanced Manual Switch+SF (High or Low) is requested, and state transition is made to the state of Advanced Manual Switch+SF (High or Low) according to the request.

Figure 18:
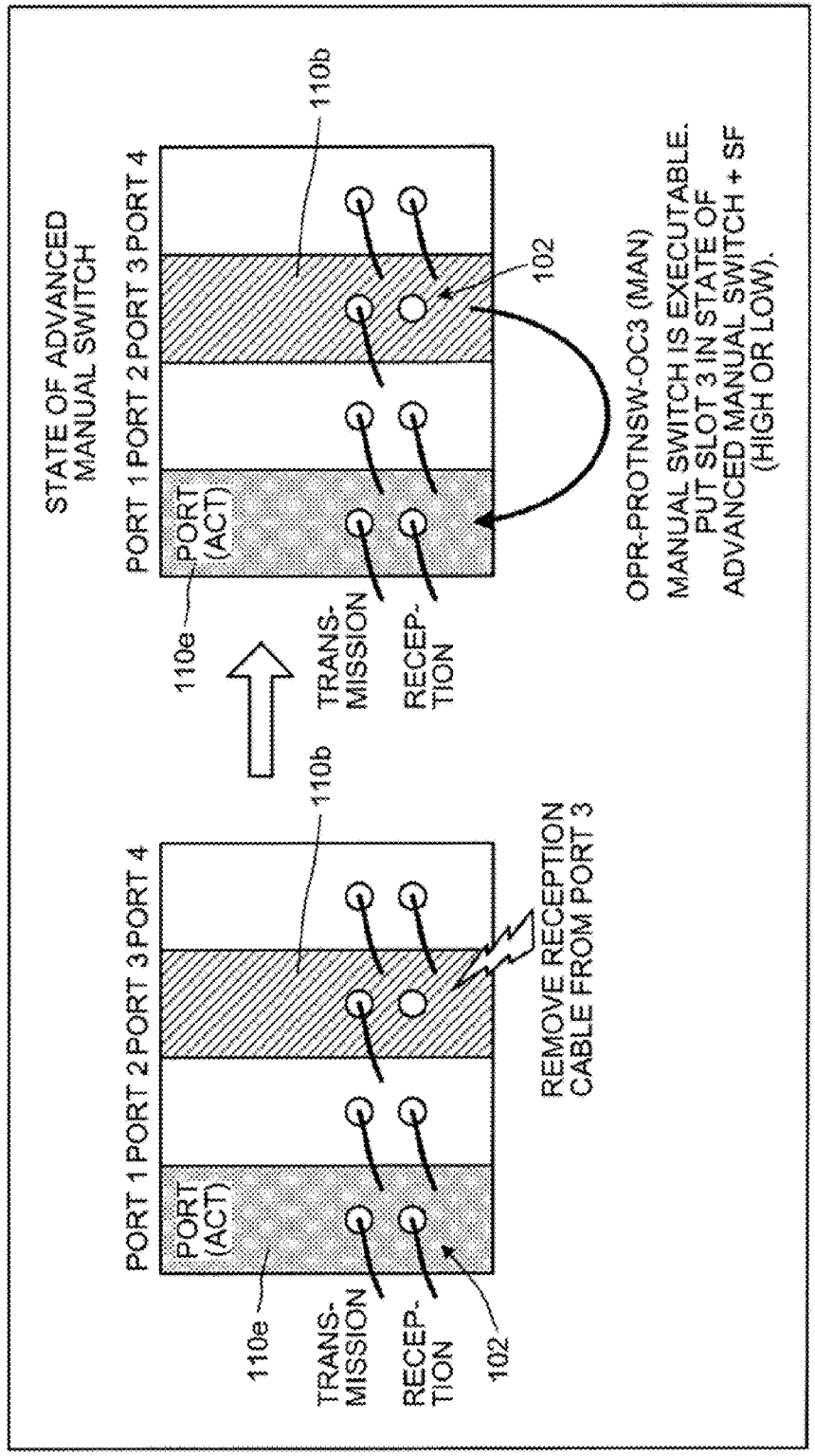
FIG. 18 is a diagram of an example of executing Manual Switch on a port after cable detachment from the port.

FIG. 18 is a diagram of an example of executing Manual Switch on a port after cable detachment from the port. If a cable detaches from the working-system port 3, the state of SF or SD (Signal Degrade) arises on the working-system port 3, and line switching is made to the standby-system port 1. In this situation, the command "OPR-PROTNSW-OC3 (Manual)" is input to the working-system port 3 to put the port 3 in the state of Manual Switch. The monitoring device 170 is able to read out the state of Manual Switch using the command "RTRV-COND-ALL". Meanwhile, inside the transmission apparatus, a switching request for switching to Advanced Manual Switch+SF (High or Low) is made, and state transition is made to the state of Advanced Manual Switch+SF (High or Low) according to the request.

Subsequently, even if the cable connected to the port 3 is disconnected from the port 3 or a fault equivalent to SF or SD occurs, the state of Manual Switch is not cleared but rather, continues. The state inside the transmission apparatus from which the cable has been removed is Advanced Manual Switch+SF (High or Low), so that state switching occurs according to a switching request for switching to the state of Advanced Manual Switch+SF (High or Low). After the cable is reconnected, state transition is made to the state of Manual Switch. According to a conventional technique, Manual Switch is cleared at the point that the cable is detached.

Figure 19:
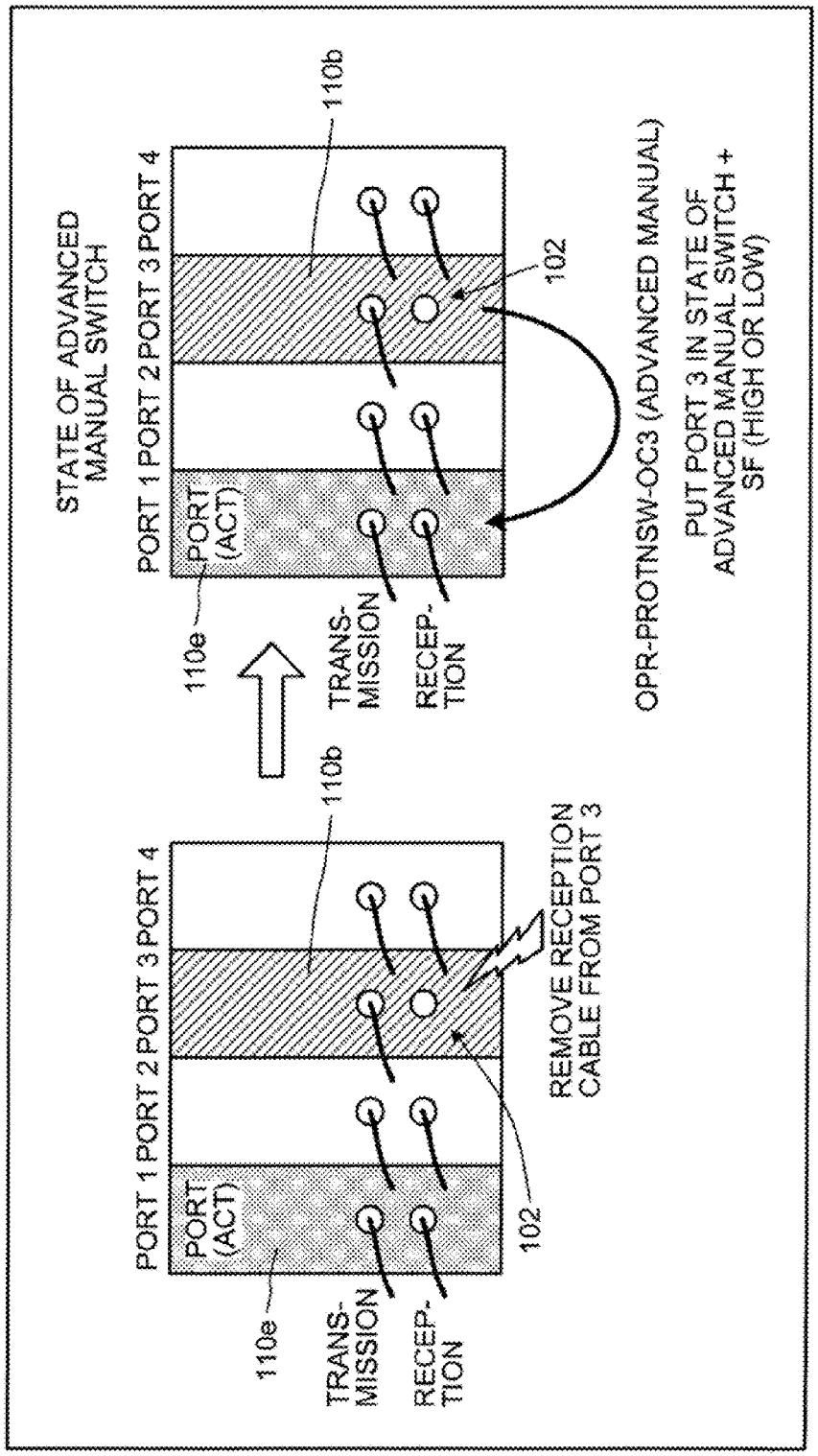
FIG. 19 is a diagram of an example of executing Advanced Manual Switch on a port after cable detachment from the port.

FIG. 19 is a diagram of an example of executing Advanced Manual Switch on a port after cable detachment from the port. Different from the example of specifying Manual Switch using the command "OPR-PROTNSW-OC3 (Manual)", Advanced Manual Switch may be input directly using the command "OPR-PROTNSW-OC3 (Advanced Manual)", as depicted in FIG. 19.

Figure 20:
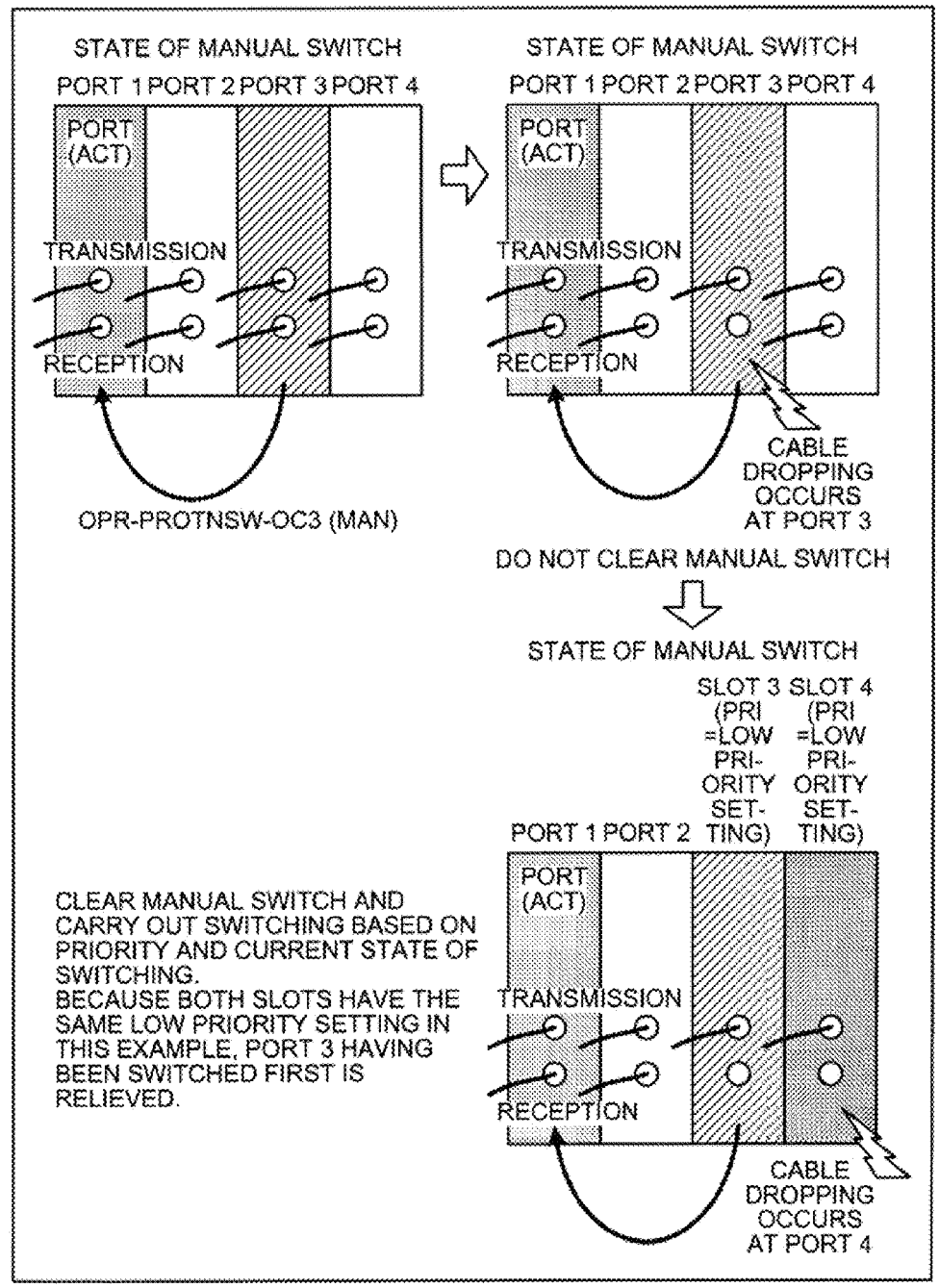
FIG. 20 is a diagram of an example of cable detachment from a different port after execution of Manual Switch.

FIG. 20 is a diagram of an example of cable detachment from a different port after execution of Manual Switch. If a cable becomes detached from the working-system port 3, causing a fault equivalent to SF or SD and line switching is made to the standby-system port 1, the command "OPR-PROTNSW-OC3 (Manual)" for switching to the state of Manual Switch is input to the working-system port 3 to put the port 3 in the state of Manual Switch. After this, even if the interface unit 110 of the port 3 is removed, the port 3 maintains its state of Manual Switch in the same manner as described above. Subsequently, if a fault equivalent to SF or SD occurs on a working-system port 4 different from the port 3 due to cable detachment, etc., the state of Manual Switch is cleared and relief operation is carried out according to the priority set for the ports 3 and 4. If the priority set for the ports 3 and (PRI=High/Low) are the same (Low), as depicted in FIG. 20, the port 3 having been switched first is given priority in relief operation to continue.

A third example describes an application example of transmitting and receiving the switching information K1 and K2 bytes between transmission apparatuses will be described. As depicted in FIGS. 2 and 3, a transmission path can be switched freely from the working system to the standby system between a shelf 1 of the transmission apparatus 100 and a shelf 2 of the transmission apparatus 100.

Figure 21:
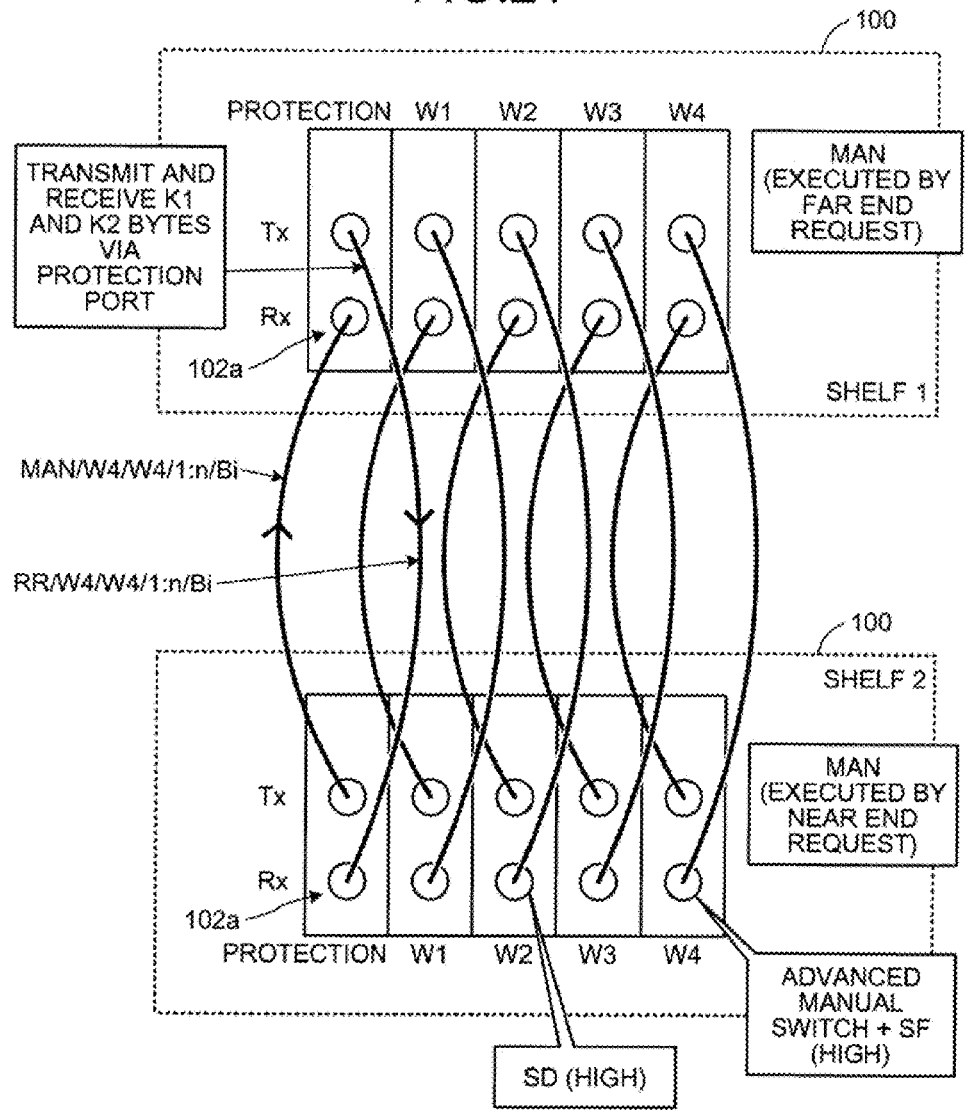
FIG. 21 is a diagram of an application example of switching information K1 and K2.

FIG. 21 is a diagram of an application example of switching information K1 and K2. It is assumed that initially, a working-system port W4 of the shelf 2 is in the state of Advanced Manual Switch+SF (High), a working-system port W2 of the shelf 2 is in the state of SD (High), and working-system ports W1 and W3 of the shelf 2 are in the state of No Request. MAN in FIG. 21 is an abbreviation of Manual Switch. Here, the state of Advanced Manual Switch+SF (High) has a higher priority than the state of SD (High) and thus, switching to the state of Advanced Manual Switch+SF (High) is executed to switch the port W4 to the working system. As a result, the switching information K1 and K2 bytes are transmitted and received between the shelves 1 and 2, via the standby-system (protection) port 102a. The shelf 2 transmits switching information "MAN (Manual Switch)/W4/W4/1:n/Bi (Bi-directional mode, see FIG. 29)" to the shelf 1, using the switching information K1 and K2 bytes.

It is assumed that here that the working-system ports W1 to W4 of the shelf 1 are in the state of No Request, in which no specific fault factor requiring switching arises. In this situation, a line switching method of Bi-directional is set on the K2 byte, so that switching corresponding to the switching information "MAN/W4/W4/1:n/Bi" transmitted from the shelf 2 is executed with priority over the shelf 1.

Although transmission of switching information of "SF (High)/W4/W4/1:n/Bi" from the shelf 2 is also conceivable, Manual Switch is transmitted as the switching information "MAN/W4/W4/1:n/Bi" to report the state of Manual Switch executed by a Far end request.

Figure 22:
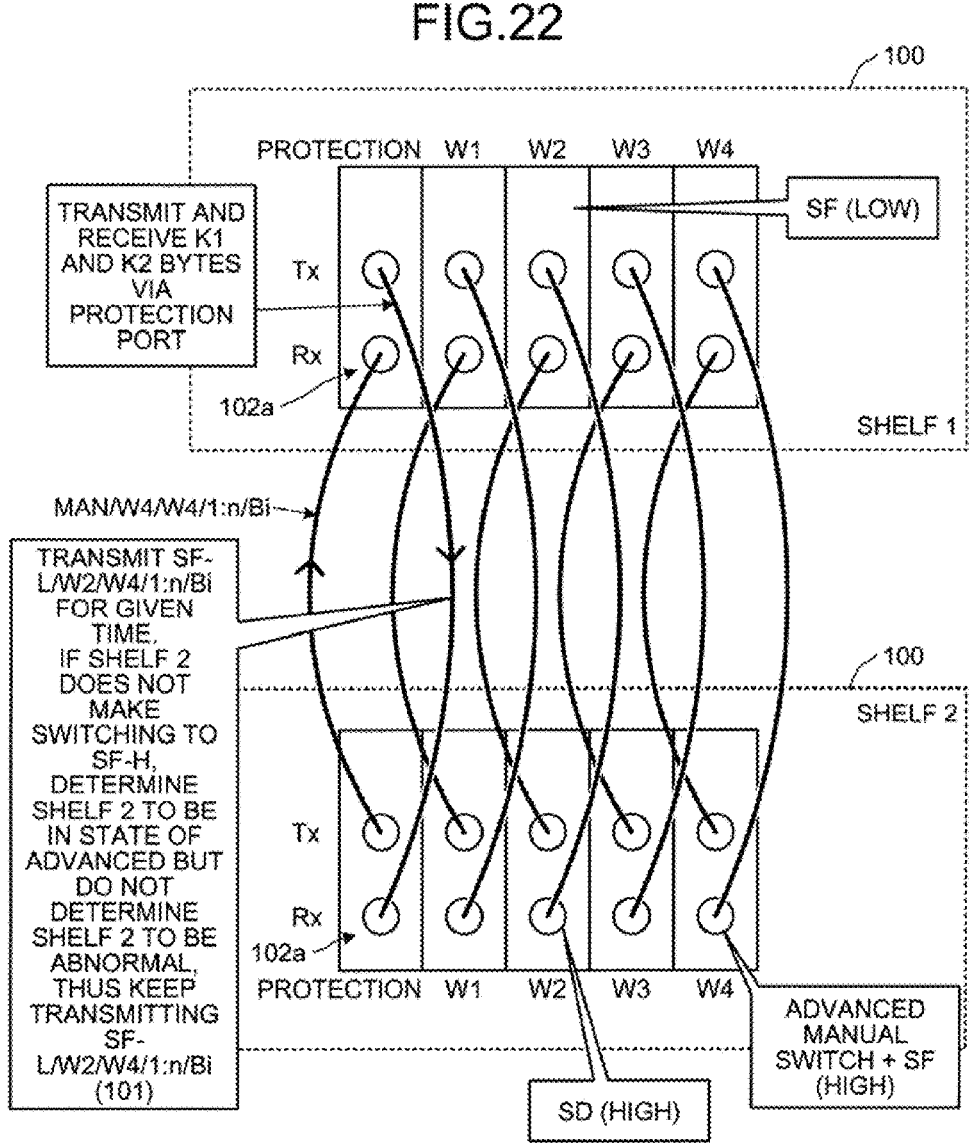
FIG. 22 is a diagram of another application example of switching information K1 and K2.

FIG. 22 is a diagram of another application example of switching information K1 and K2. It is assumed that following the situation depicted in FIG. 21, a fault of SF (Low) occurs on the working-system port W2 of the shelf 1. In this case, because of reception of the switching information "MAN/W4/W4/1:n/Bi" from the shelf 2, the shelf 1 determines that the state of SF (Low) of the shelf 1 (the station) has a higher priority, and transmits switching information "SF-L/W2/W4/1:n/Bi" to the shelf 2. As a result, switching to the state of SF (Low) according to the priority thereof is expected to occur on the shelf 2. If no response is received from the shelf 2 within a given period, the shelf 1 detects the shelf 2 to be abnormal. The shelf 1, however, does not output an alarm, such as Protection Switch Byte Failure, to an external apparatus, but determines that the shelf 2 is in the state of Advanced Manual Switch+SF (Low or High). The shelf 1 thus keeps transmitting the switching information "SF-L/W2/W4/1:n/Bi" to the shelf 2.

Figure 23:
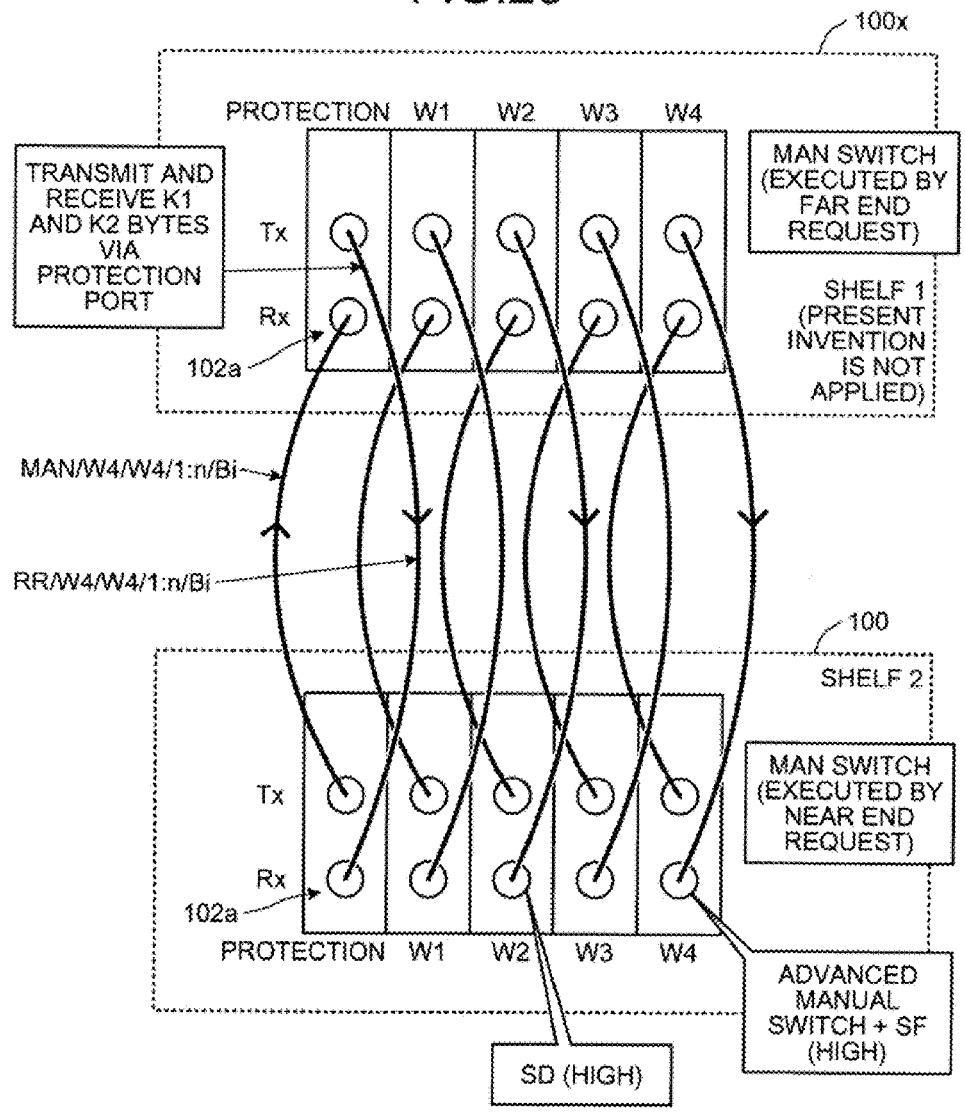
FIG. 23 is a diagram of the respective operations carried out between the transmission apparatus and an existing apparatus.

FIG. 23 is a diagram of the respective operations carried out between the transmission apparatus and an existing apparatus to which the definition and setting of Advanced Manual Switch are have not been made. The shelf 1 (100x) is the existing apparatus without the definition of the state of Advanced Manual Switch, and the shelf 2 is the transmission apparatus having the definition and setting of the state of Advanced Manual Switch. The same circumstances as those of FIG. 21 are assumed and the port W4 is switched to the working system. In this example, the working-system port W4 of the shelf 1 is in the state of Manual Switch, while the working-system port W4 of the shelf 2 is in the state of Advanced Manual Switch+SF (High). Between the shelves 1 and 2, the K1 and K2 bytes are transmitted and received via the standby-system (Protection) port 102a.

Figure 24:
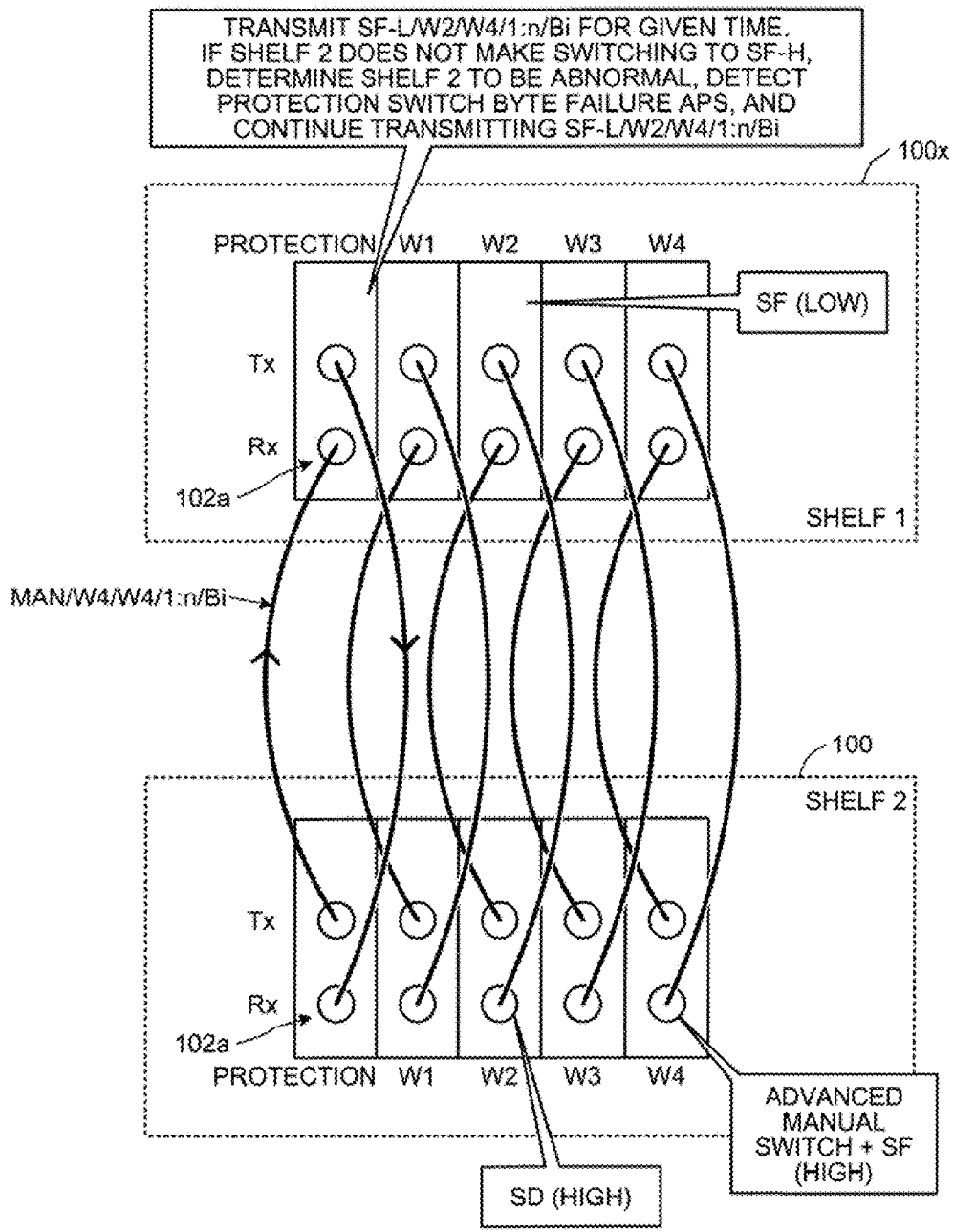
FIG. 24 is another diagram of the respective operations carried out between the transmission apparatus and the existing apparatus.

FIG. 24 is another diagram of the respective operations carried out between the transmission apparatus and the existing apparatus. It is assumed that after the operation depicted in FIG. 23, a fault of SF (Low) occurs on the working-system port W2 of the shelf 1. As a result of the fault, the shelf 1 (100x) transmits the switching information "SF-L (Low)/W2/W4/1:n/Bi" to the shelf 2 for a given period, using the K1 and K2 bytes. If the shelf 2 does not carry out switching to a state of SF-H (High), the shelf 1 will detect the shelf 2 to be abnormal (Protection Switch Byte Failure APS). In this case, the shelf 1 continues to transmit the switching information "SF-L/W2/W4/1:n/Bi" to the shelf 2, using the K1 and K2 bytes. In this manner, when the shelf 1, as the existing apparatus, transmits the switching information "SF-L/W2/W4/1:n/Bi" to the shelf 2 but continues to receive a response from the shelf 2 indicative of the shelf 2 being in the state of Manual Switch even after an elapse of a given period, the shelf 1 may continue to transmit the same switching information. At this point in time, the shelf 2 is executing Advanced Manual Switch. Hence, even if the shelf 1 is an existing apparatus without an Advanced Manual Switch setting, the shelf 1 is able to continue operations with respect to the shelf 2.

A fourth example relates to bit allocation for newly defined switching information K1 and K2 for Advanced Manual Switch. As described with reference to FIG. 29, "011" and "010" as the bits 6-8 of the K2 byte are not defined at present but are reserved for future use. These bits 6-8 are used in a new definition.

FIG. 25 is a diagram of an allocation example of the switching information K1 and K2. In the example depicted in FIG. 25, undefined "011" and "010" as the bits 6-8 of the K2 byte are used for Advanced Manual Switch in the following manner.

"011": Bi-directional Mode+Advanced Manual Switch
"010": Uni-directional Mode+Advanced Manual Switch With such definitions, "011" and "010" as the bits 6-8 of the K2 byte are transmitted and received only when Advanced Manual Switch is executed.

If the bits 6-8 of the K2 byte are "011", the reception-side determines that the switching information indicates a line switching method of Bi-directional Mode and the state of Advanced Manual Switch, and that the state of the counterpart node is any one of the following states.

"1101": Advanced Manual Switch+SF (High)
"1100": Advanced Manual Switch+SF (Low)
"1011": Advanced Manual Switch+SD (High)
"1010": Advanced Manual Switch+SD (Low)

Similarly, if the bits 6-8 of the K2 byte are "010", the reception-side determines that the switching information indicates a line switching method of Uni-directional Mode and the state of Advanced Manual Switch, and that the state of the counterpart node is any one of the following states.

"1101": Advanced Manual Switch+SF (High)
"1100": Advanced Manual Switch+SF (Low)
"1011": Advanced Manual Switch+SD (High)
"1010": Advanced Manual Switch+SD (Low)

In the example depicted in FIG. 25, the working-system port W2 of the shelf 2 is in the state of SD (High) and the port W4 of the shelf 2 is in the state of Advanced Manual Switch+SF (High). In this case, the shelf 2 transmits "SF-H/W4/W4/1:n/011" as switching information using the K1 and K2 bytes.

FIG. 26 is another diagram of an allocation example of the switching information K1 and K2, a fifth example. The same circumstances as those depicted in FIG. 21 are assumed for the shelf 2, where the port W4 is switched to the working system. In this example, the shelf 2 executes switching to the state of Advanced Manual Switch+SF (High) having the highest priority, based on switching requests of the ports W1 to W4 of the shelf 2. The shelf 2 alternately transmits the following switching information to the shelf 1, using the K1 and K2 bytes, in order to execute switching to the state of Advanced Manual Switch.

Switching information 1 "SF-H/W4/W4/1:n/Bi"
Switching information 2 "MAN/W4/W4/1:n/Bi"

As a result, the shelf 1 at the reception-side determines that the shelf 2 is in the state of Advanced Manual Switch+SF (High), and executes switching corresponding to the state of the shelf 2. In the case of alternating transmission of the switching information 1 and 2, the K1 and K2 bytes may seem to be unstable. To deal with this, an exceptional condition is set to the shelf 1, a condition preventing the shelf 1 from detecting the switching information 1 and 2 to be Protection Switch Byte Failure, upon receiving the information.

FIG. 27 is a diagram of an example of bit allocation for Advanced Manual Switch in the switching information K1 and K2. For switching information for Advanced Manual Switch #1 to #4, a code (bit information) allocated to a command different from Advanced Manual Switch is used in bit allocation for the K1 bytes of commands of FIG. 6.

In a first configuration example, the bits 1-4 of the K1 byte are allocated to represent the state of SF and of SD, and the bits 6-8 of the K2 byte are allocated to represent the command of Advanced Manual Switch by using undefined bits "010" and "011" as the bits 6-8. In a second configuration example, only the bits 1-4 of the K1 byte are used to alternately transmit any one of bits "1101", "1100", "1011", and "1010" representing setting for SD and SF and a bit "1000" representing setting for Manual Switch.

FIG. 28 is a flowchart for explaining an example of a process of transmitting the switching information K1 and K2. FIG. 28 depicts an example of transmission of the command of Advanced Manual Switch+SF (High) among commands described in the second configuration example. When switching is made to Advanced Manual Switch+SF (High) (step S2801), switching information K1 and k2 composed of the command of SF (High) "SF-H/W4/W4/1:n/Bi" and the command of Manual Switch "MAN/W4/W4/1:n/Bi" is made (step S2802).

Subsequently, the transmission apparatus at the transmission-side sets the counter k to an initial value 1 (step S2803), and determines whether the counter k is an odd number (step S2804). If the counter k is an odd number (step S2804: YES), the transmission apparatus first transmits the command for SF (High) "SF-H/W4/W4/1:n/Bi" (step S2805), and increases the counter k by 1 (step S2806). Subsequently, steps following step S2804 are repeated until the end of the transmission of the command of Advanced Manual Switch+SF (High), i.e., the occurrence of a request for the release of Advanced Manual Switch+SF (High) (step S2807). The next transmission is carried out when the counter k is an even number (step S2804: NO), and the command of Manual Switch "MAN/W4/W4/1:n/Bi" is transmitted at the next transmission (step S2808). Thereafter, the commands of SF (high) and Manual Switch are transmitted alternately.

According to the setting of Advanced Manual Switch described in the embodiments, when a fault-causing working-system unit or cable is removed for replacement, the state of Manual Switch executed before the removal can be maintained. This prevents the immediate occurrence of switchback after restoration from the fault of the working system and thus, no instantaneous line disconnection or line fault occurs.

The transmission apparatus disclosed herein offers an effect of preventing immediate line switchback that occurs at the time of restoration from a fault.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus that switches to a line of one standby system upon occurrence of a fault on any one of n lines of a working system, comprising:
 a switching controller that when switching from a line of the working system to a line of the standby-system upon the occurrence of the fault and executing a given command to put the line causing the fault in a given state of line switching according to the given command, causes the working system to maintain the state of line switching according to the given command even after restoration from the fault, wherein the given command is one of a plurality of commands conforming to a prescribed communication standard and having a priority corresponding to a level of the fault, and the switching controller has set therein a definition of advanced manual switch that has a priority between manual switch and forced switch defined as a command having a higher priority than the manual switch, the switching controller further maintains and reports the state of the line switching as the manual switch to a destination external to the transmission apparatus while bringing about, inside the transmission apparatus, a state of line switching having a higher fault level than the manual switch;

wherein the commands are set in descending order of priority including the forced switch>SF (high)>the advanced manual switch+SF (signal fail-high)>SF (low)>the advanced manual switch+the SF (low)>SD (signal degrade-high)>the advanced manual switch+SD (high)>SD (low)>the advanced manual switch+the SD (low)>the manual switch, where terms subsequent to "+" represent states reported to the destination external to the transmission apparatus; and wherein the switching controller, after execution of a command for the manual switch on the line causing the fault, if a fault having a higher priority occurs, makes transition to a state equivalent to the fault having the higher priority.

2. The transmission apparatus according to claim 1, wherein the switching controller, when the state of the SF (high) arises as a switching request when the working system is in the state of the manual switch, outputs the state of the SF (high) to the destination external to the transmission apparatus while bringing about, inside the transmission apparatus, the state of the advanced manual switch+the SF (high).

3. The transmission apparatus according to claim 1, wherein the switching controller, when the state of the SF (low) arises as a switching request when the working system is in the state of the manual switch, outputs the state of the SF (low) to the destination external to the transmission apparatus while bringing about, inside the transmission apparatus, the state of the advanced manual switch+the SF (low).

4. The transmission apparatus according to claim 1, wherein the switching controller, when the state of the SD (high) arises as a switching request when the working system is in the state of the manual switch, outputs the state of the SD (high) to the destination external to the transmission apparatus while bringing about, inside the transmission apparatus, the state of the advanced manual switch+the SD (high).

5. The transmission apparatus according to claim 1, wherein the switching controller, when the state of the SD (low) arises as a switching request when the working system is in the state of the manual switch, outputs the state of the SD (low) to the destination external to the transmission apparatus while bringing about, inside the transmission apparatus, the state of the advanced manual switch+the SD (low).

6. The transmission apparatus according to claim 1, wherein the switching controller brings about, inside the transmission apparatus, the state of the advance manual switch after receiving input of a command of the manual switch and subsequently, a fault of SD or SF occurs.

7. The transmission apparatus according to claim 1, wherein the switching controller, at time of restoration from a fault of SD or SF after the state of the advanced manual switch, makes transition to the state of the manual switch, inside the transmission apparatus.

8. The transmission apparatus according to claim 1, wherein the switching controller receives input of the command of the advanced manual switch and makes transition, inside the transmission apparatus, to the state of the advanced manual switch in response to the occurrence of the fault of SD or SF or restoration from the fault.

9. The transmission apparatus according to claim 1, further comprising a command input/output unit that when the advanced manual switch is a state resulting from switching by the switching controller, transmits manual switch as switching information to be reported to the destination external to the transmission apparatus.

10. The transmission apparatus according to claim 9, wherein the command input/output unit transmits bit information of the manual switch defined by bits 1-4 of a K1 byte as the switching information.

11. The transmission apparatus according to claim 9, wherein the switching controller determines that the advanced manual switch is executed at a second transmission apparatus, if despite transmitting the switching information following occurrence of a fault of SF or SD at the second transmission apparatus, the switching controller continues to receive a response indicative of the state of the manual switch from the second transmission apparatus.

12. The transmission apparatus according to claim 9, wherein the command input/output unit transmits bit information concerning SF or SD defined by bits 1-4 making up a K1 byte, as the switching information when transmitting the advanced manual switch.

13. The transmission apparatus according to claim 9, wherein the command input/output unit transmits information concerning a bi-directional mode or uni-directional mode as the switching information, using undefined bit information of a K2 byte, when transmitting the advanced manual switch.

14. The transmission apparatus according to claim 9, wherein the command input/output unit alternately transmits, as the switching information, bit information concerning the manual switch and information concerning SF or SD, using bits 1-4 of a K1 byte, when transmitting the advanced manual switch.

* * * * *